(12) United States Patent
Gupta

(10) Patent No.: US 12,289,312 B2
(45) Date of Patent: Apr. 29, 2025

(54) PRIVACY PREFERENCE BASED DEVICE CONTROLS

(71) Applicant: Avast Software s.r.o., Prague (CZ)

(72) Inventor: Rajarshi Gupta, Los Altos, CA (US)

(73) Assignee: Avast Software s.r.o., Prague (CZ)

( * ) Notice: Subject to any disclaimer, the term of this patent is extended or adjusted under 35 U.S.C. 154(b) by 622 days.

(21) Appl. No.: 17/687,235

(22) Filed: Mar. 4, 2022

(65) Prior Publication Data

US 2022/0239657 A1    Jul. 28, 2022

Related U.S. Application Data

(62) Division of application No. 16/714,318, filed on Dec. 13, 2019, now Pat. No. 11,496,479.

(51) Int. Cl.
| | |
|---|---|
| *H04L 9/40* | (2022.01) |
| *G06F 3/0482* | (2013.01) |
| *G06F 17/16* | (2006.01) |
| *G06F 21/62* | (2013.01) |
| *H04L 67/50* | (2022.01) |

(52) U.S. Cl.
CPC .......... *H04L 63/102* (2013.01); *G06F 3/0482* (2013.01); *G06F 17/16* (2013.01); *G06F 21/6245* (2013.01); *H04L 67/535* (2022.05); *G06F 2221/2141* (2013.01)

(58) Field of Classification Search
CPC ... H04L 63/102; H04L 67/535; G06F 3/0482; G06F 17/16; G06F 21/6245; G06F 2221/2141
See application file for complete search history.

(56) References Cited

U.S. PATENT DOCUMENTS

| | | | |
|---|---|---|---|
| 10,097,583 B1 | 10/2018 | Demirjian et al. | |
| 10,402,585 B2 | 9/2019 | Hu et al. | |
| 11,126,745 B1 | 9/2021 | Sankuratripaki et al. | |
| 2010/0280965 A1* | 11/2010 | Vesterinen .......... | G06F 21/6245 709/204 |
| 2012/0323741 A1* | 12/2012 | Rangachari ........ | G06Q 30/0601 705/26.1 |
| 2014/0059129 A1* | 2/2014 | Chumbley ............ | G06F 16/955 709/204 |
| 2015/0161210 A1* | 6/2015 | Cook ..................... | G06Q 30/06 707/600 |

(Continued)

OTHER PUBLICATIONS

Website Screencapture from mygaru.com, accessed Jan. 21, 2020.
Office Action dated Feb. 1, 2022 for U.S. Appl. No. 16/714,318.

*Primary Examiner* — Kambiz Zand
*Assistant Examiner* — Afaq Ali
(74) *Attorney, Agent, or Firm* — Dovas Law, P.C.

(57) ABSTRACT

A data control method includes receiving from a user an indication of data for sharing, receiving from the user an indication of one or more recipients with which to share the data, and receiving from the user one or more allowed actions for the data. A multidimensional zone is determined based on the indication of the data for sharing, the indication of the one or more recipients, and the one or more allowed actions for the data. A plurality of application program interfaces (APIs) for a plurality of applications are accessed. Data sharing permissions are set for the user for each of the plurality of applications based on the multidimensional zone via the plurality of APIs.

21 Claims, 13 Drawing Sheets

(56) References Cited

U.S. PATENT DOCUMENTS

| | | | |
|---|---|---|---|
| 2016/0112376 A1* | 4/2016 | Gomez | H04L 63/20 |
| | | | 713/168 |
| 2017/0140171 A1 | 5/2017 | Antonelli et al. | |
| 2017/0366966 A1* | 12/2017 | Carter | H04L 51/48 |
| 2019/0108353 A1* | 4/2019 | Sadeh | G06F 21/6245 |
| 2019/0116142 A1 | 4/2019 | Chalakudi et al. | |
| 2020/0351271 A1* | 11/2020 | Murdoch | H04L 63/102 |

* cited by examiner

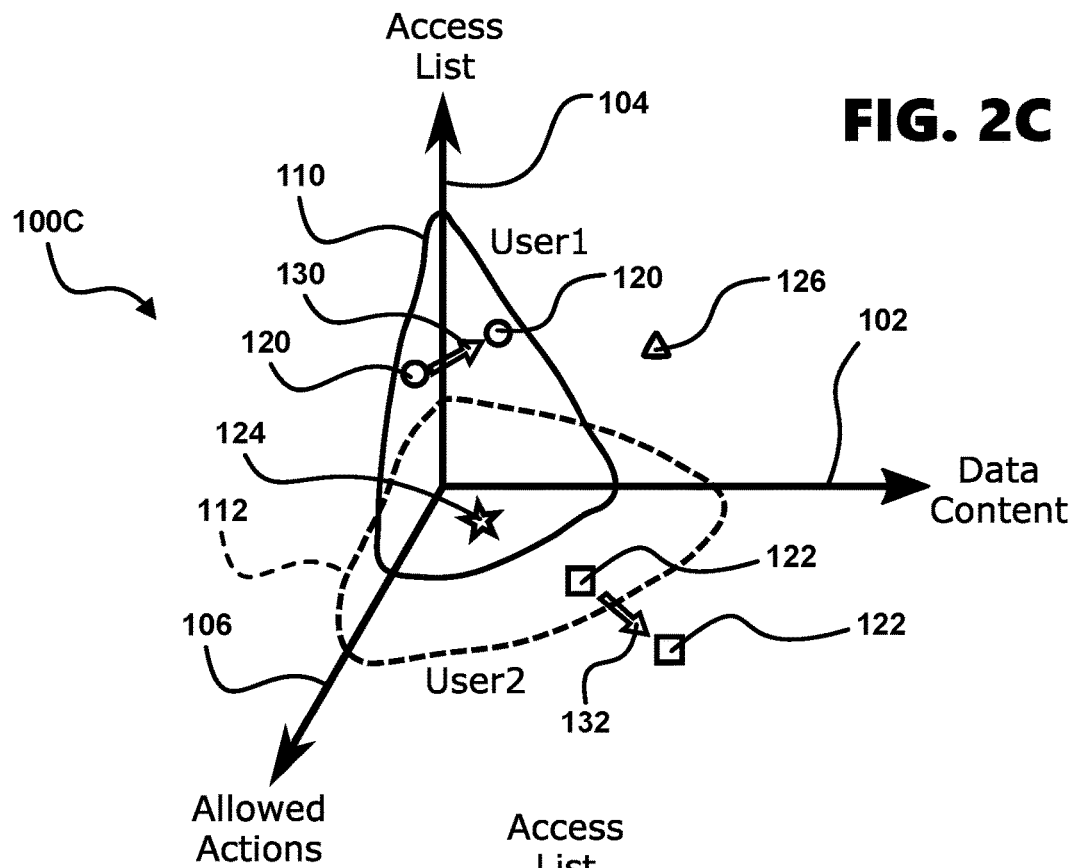
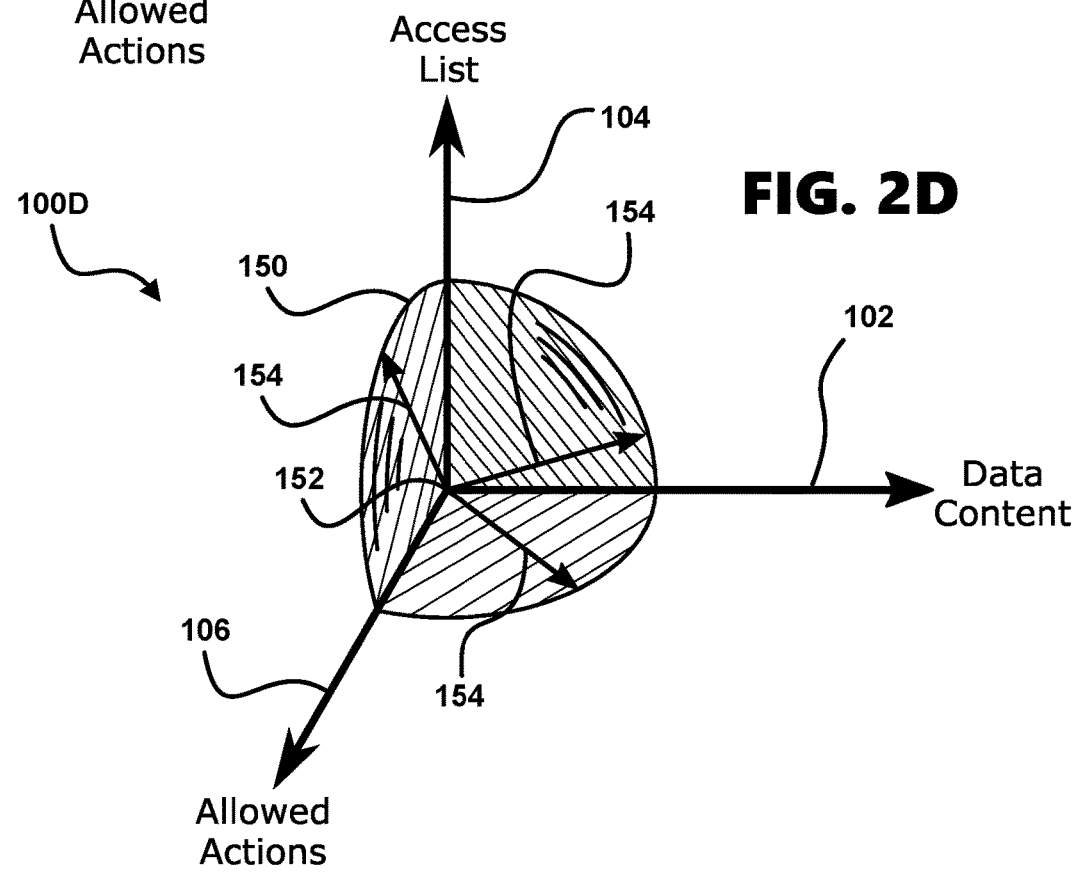

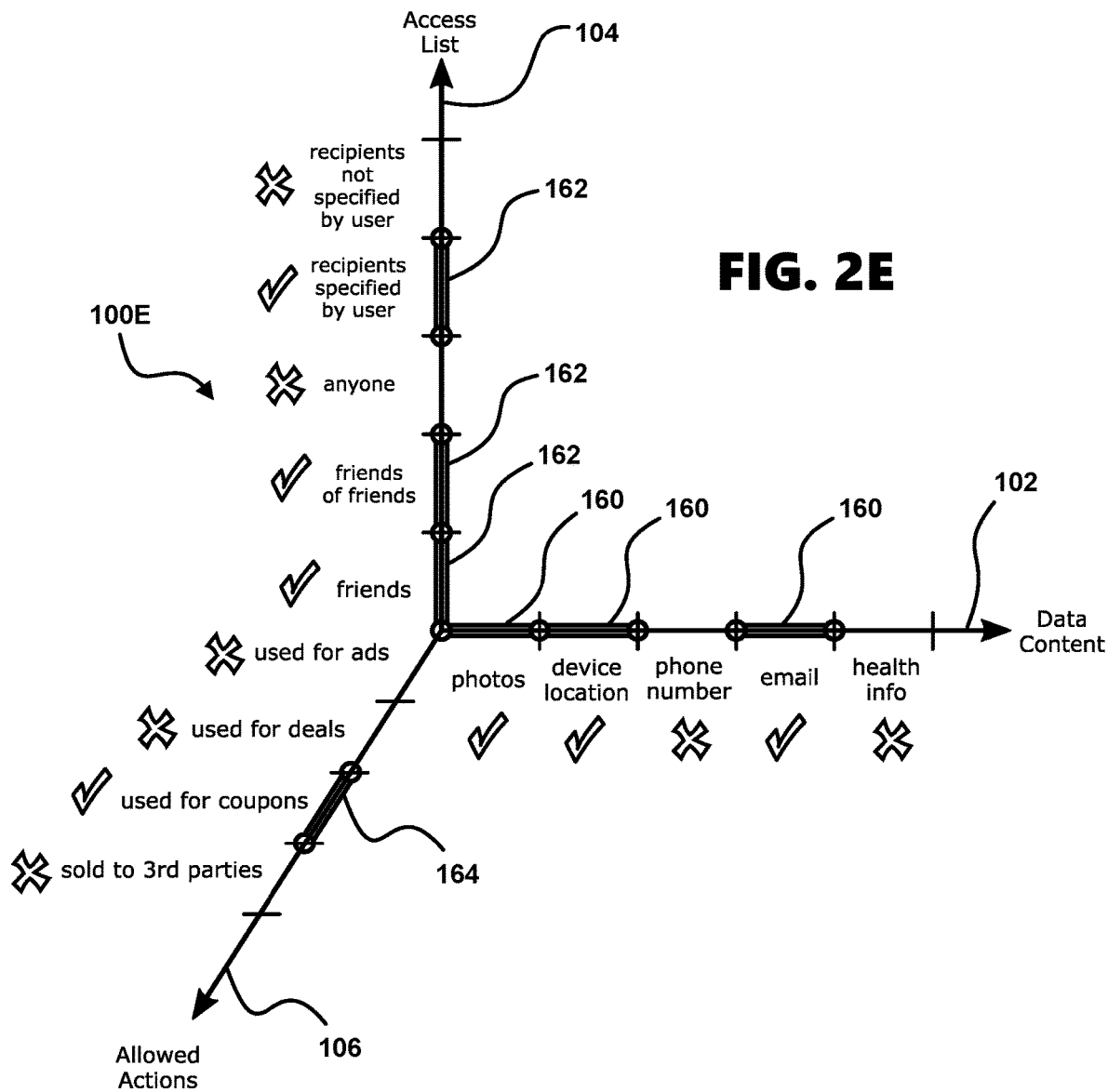

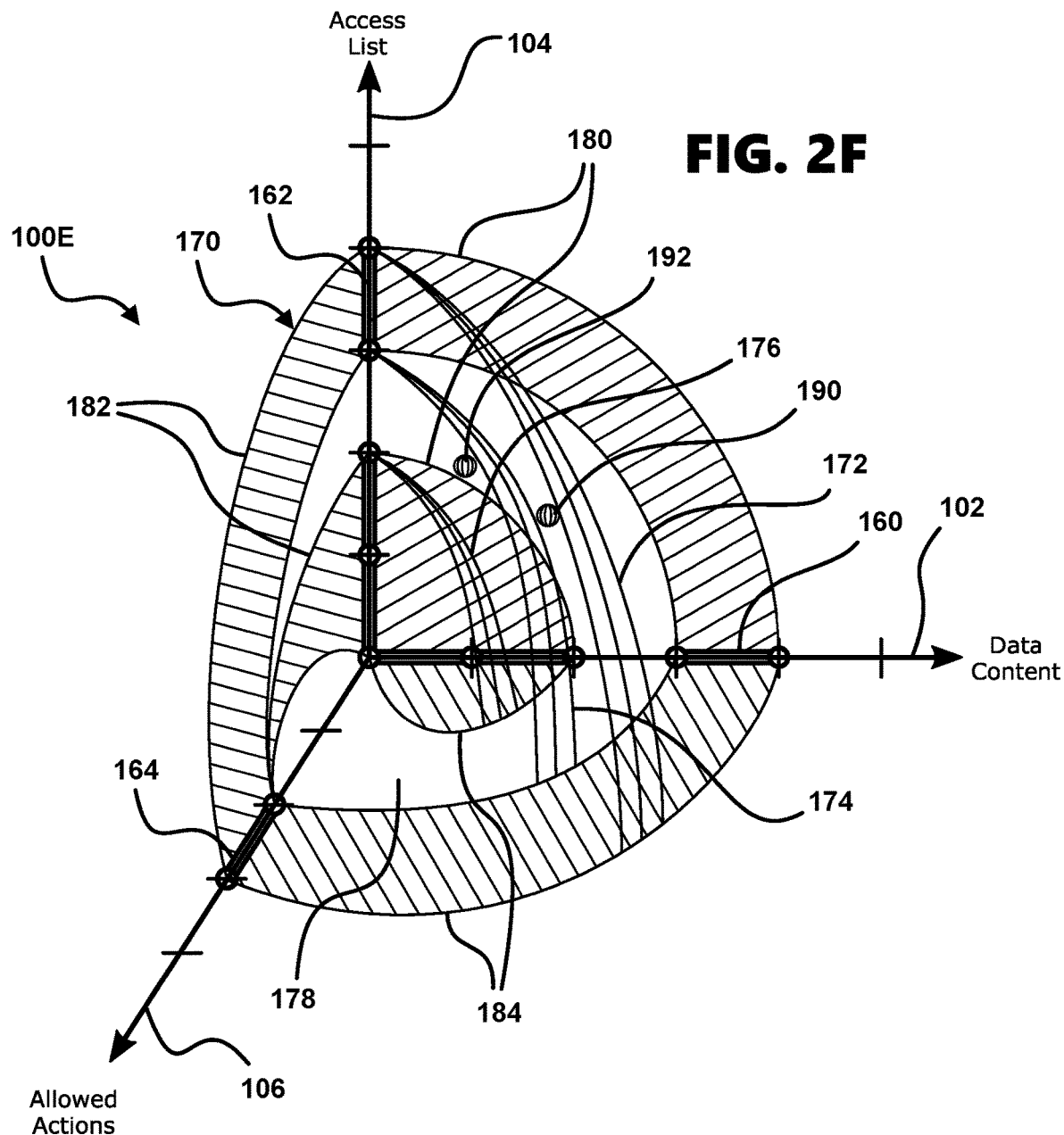

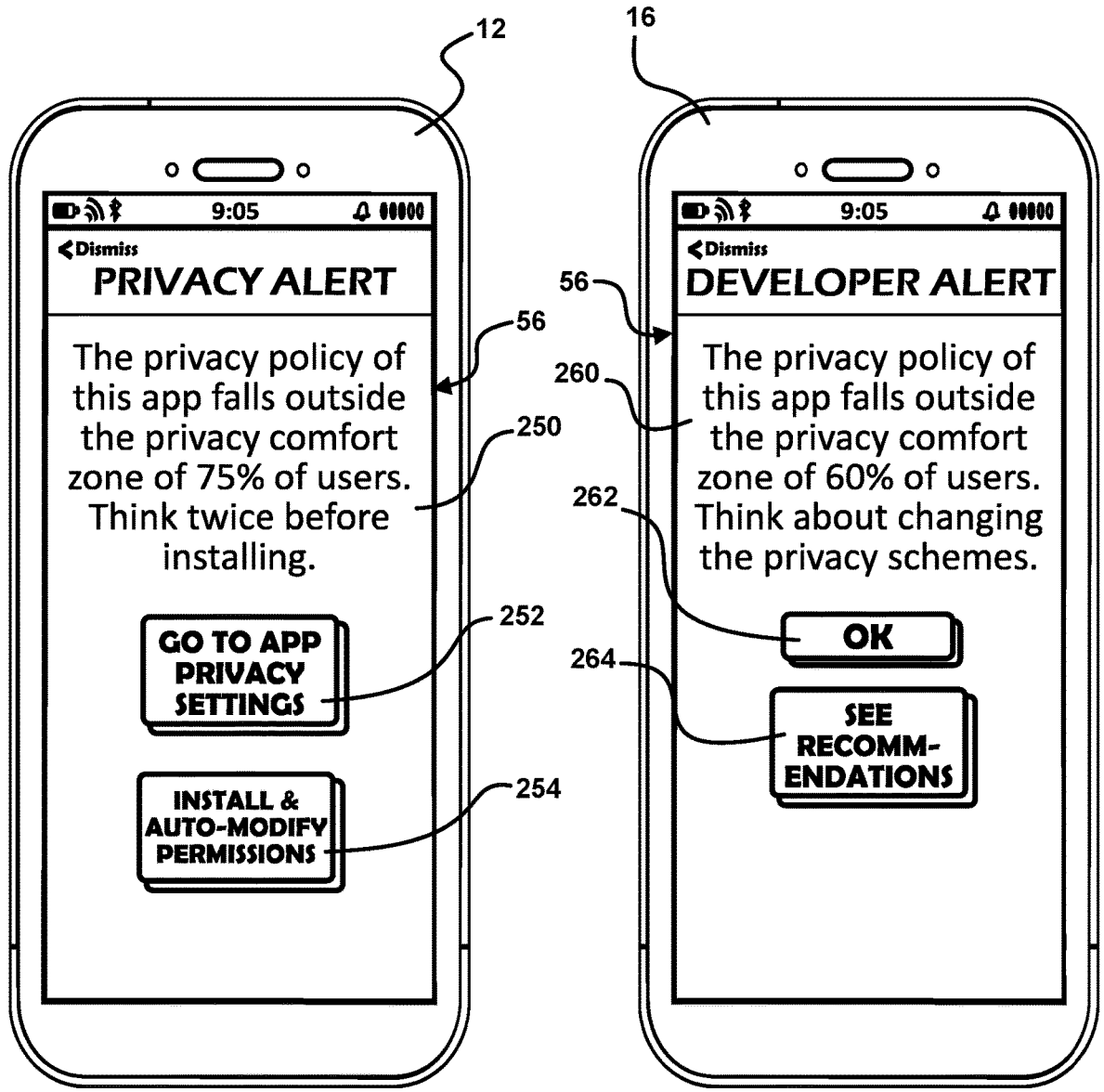

PRIVACY PREFERENCE BASED DEVICE CONTROLS

CROSS REFERENCE TO RELATED APPLICATION(S)

This application is a division of U.S. patent application Ser. No. 16/714,318, filed Dec. 13, 2019, which is incorporated by reference as if fully set forth.

FIELD OF INVENTION

The invention relates generally to data privacy, and more particularly to data sharing permissions.

BACKGROUND

Privacy settings of different popular computer applications are complex and ever changing. Users often have a difficult time understanding what the privacy settings mean. There is often no common language in use to describe the privacy settings offered by various applications. Users may not know what type of privacy they desire for a particular application or what actions a particular application will take with the users' personal data.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method for controlling the enabling of an application is provided. The method includes receiving from a particular user an indication of data for sharing and an indication of one or more recipients with which to share the data. A multidimensional zone is determined based on the indication of the data for sharing and the indication of the one or more recipients. A request from the particular user to enable a particular application via a computing device is detected. Data permission requirements of the particular application are accessed, and a multidimensional coordinate is determined based on the data permission requirements of the particular application. The multidimensional zone is compared to the multidimensional coordinate, and the particular user is notified via the computing device of the comparing of the multidimensional zone to the multidimensional coordinate. An affirmation of the request is received from the particular user via the computing device, and the particular application is enabled responsive to the affirmation of the request.

Further provided is a data control method. The method includes receiving from a particular user an indication of data for sharing and an indication of one or more recipients with which to share the data. A multidimensional zone is determined based on the indication of the data for sharing and the indication of the one or more recipients. A plurality of application program interfaces (APIs) for a plurality of applications are accessed via a network, and data sharing permissions are set for the particular user for each of the plurality of applications based on the multidimensional zone via the plurality of APIs.

Further provided is an application execution control method. The method includes receiving from a user an indication of data for sharing and an indication of one or more recipients with which to share the data. A multidimensional zone is determined based on the indication of the data for sharing and the indication of the one or more recipients. An accessing of a particular application by the user via a computing device is detected. Rules for the particular application indicating information to be shared are accessed. Rules for the particular application indicating targets of the information to be shared are accessed. A multidimensional coordinate is determined based on the information to be shared and the targets of the information to be shared. The multidimensional zone is compared to the multidimensional coordinate. The user is notified based on a position of the multidimensional coordinate relative to the multidimensional zone. A request is received from the user to disable the particular application, and the particular application is disabled.

In another provided method for controlling application enabling, an indication of data for sharing and one or more allowed actions for the data are received. A multidimensional zone is determined based on the indication of the data for sharing and the one or more allowed actions for the data. A request is detected from the user to enable a particular application via a computing device. Data permission requirements of the particular application are accessed, and a multidimensional coordinate is determined based on the data permission requirements of the particular application. The multidimensional zone is compared to the multidimensional coordinate based on the data permission requirements to generate comparison results. The user is notified via the computing device of the comparison results. An affirmation of the request is received from the user via the computing device, and the particular application is enabled responsive to the affirmation of the request from the user.

In another provided data control method, an indication of data for sharing and one or more allowed actions are received from a user. A multidimensional zone is determined based on the indication of the data for sharing and the one or more allowed actions for the data. A plurality of application program interfaces (APIs) for a plurality of applications are accessed via a network, and data sharing permissions for the user for each of the plurality of applications are set based on the multidimensional zone via the plurality of APIs.

In another provided method for controlling access to a network destination, an indication of data for sharing and an indication of one or more recipients with which to share the data are received from a particular user. A multidimensional zone is determined based on the indication of the data for sharing and the indication of the one or more recipients. A request from the particular user to access a particular webpage via a computing device is detected, and data permission requirements of the particular webpage are accessed. A multidimensional coordinate is determined based on the data permission requirements of the particular webpage. The multidimensional zone is compared to the multidimensional coordinate, and the particular user is notified via the computing device of the comparing of the multidimensional zone to the multidimensional coordinate. An affirmation of the request is received from the particular user via the computing device, and access to the particular webpage is enabled responsive to the affirmation of the request.

In another provided data control method, an indication of data for sharing and an indication of one or more recipients with which to share the data are received from a particular user. A multidimensional zone is determined based on the indication of the data for sharing and the indication of the one or more recipients. A plurality of application program interfaces (APIs) for a plurality of websites comprising a plurality of webpages are accessed via a network, and data sharing permissions are set for the particular user for each of the plurality of websites based on the multidimensional zone via the plurality of APIs.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIGS. 2A-2F show exemplary models defining multidimensional privacy comfort zones based on user privacy preferences.

FIGS. 3C-3H show example interactive displays for providing alerts regarding application data sharing permissions.

DETAILED DESCRIPTION OF ILLUSTRATIVE EMBODIMENT(S)

Figure 1:
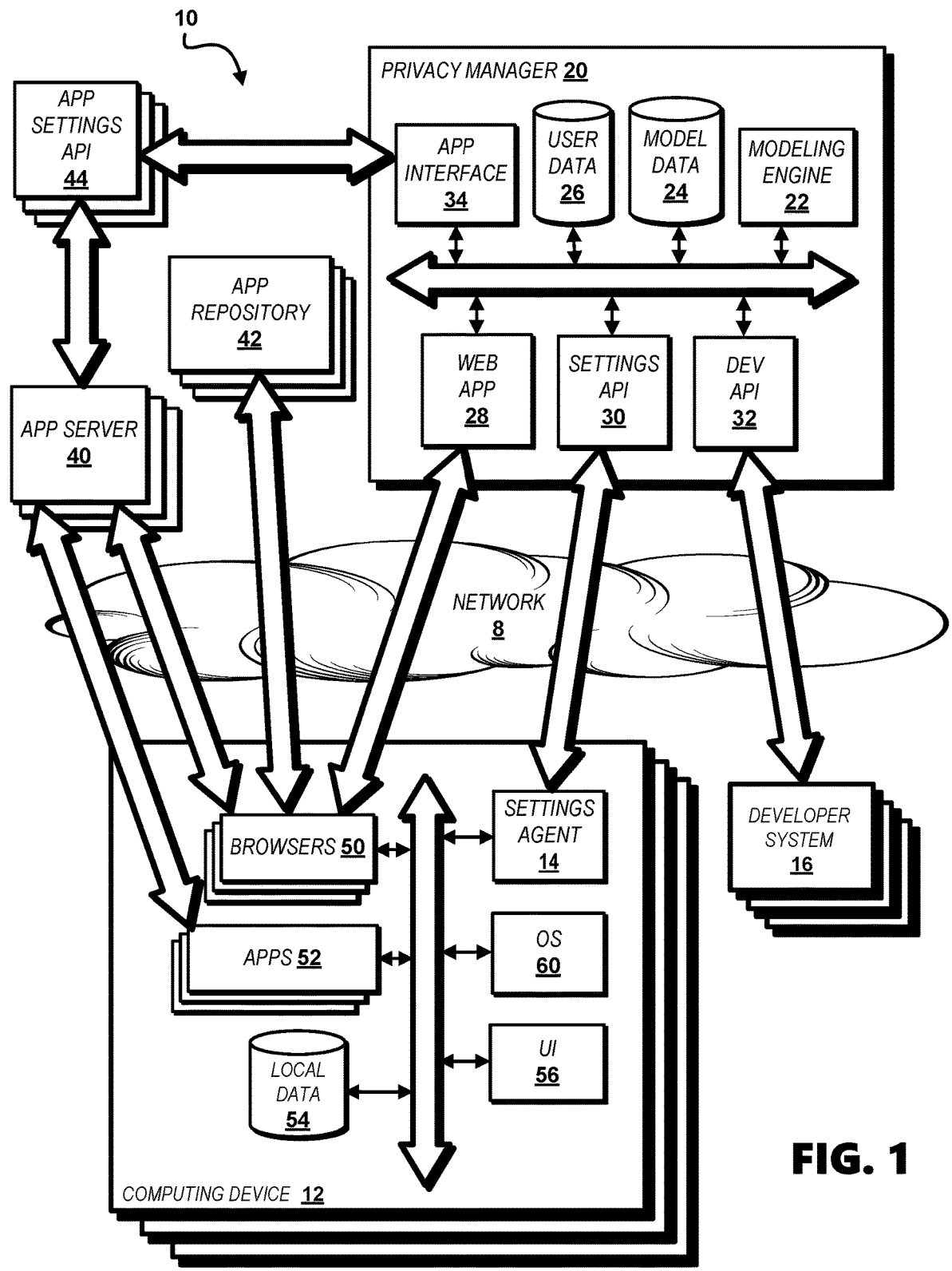
FIG. 1 shows a system enabling control of data privacy settings according to the illustrative embodiments.

Referring to FIG. 1, a system 10 for enabling control of data privacy settings of computing devices 12 is provided in a communications network 8 including one or more wired or wireless networks or a combination thereof, for example including a local area network (LAN), a wide area network (WAN), the Internet, mobile telephone networks, and wireless data networks such as WiFi™ and 3G/4G/5G cellular networks. Operating systems 60 (hereinafter "OS 60") are executed on the computing devices 12. The system 10 enables notifying users of permission requirements of applications, receiving requests to enable applications, and automatically setting data sharing permissions for applications. Further, the system 10 enables the providing of a common interface and computing environment for a user to manage the user's electronic privacy.

A network-connectable processor-enabled privacy manager 20 enables a plurality of survey queries to be provided to a user of a computing device 12. The queries can be provided in a user interface 56 via instructions from a settings agent 14 based on data transmitted from a settings application program interface (API) 30 of the privacy manager 20. Alternatively, queries can be provided in the user interface 56 based on data transmitted from a web application 28 enabled by the privacy manager 20 and accessible via a web browser 50. A user's responses to the survey queries are stored in a user datastore 26 or local datastore 54 and used by the privacy manager 20 or the settings agent 14 to generate a privacy comfort zone modeled as a multidimensional zone.

Based on the privacy comfort zone, the privacy manager 20 can automatically generate data sharing permissions via a modeling engine 22 for the user for one or more applications that a user choses to execute. The privacy manager 20 can alternatively generate data sharing permissions for websites including webpages, webpages within websites, or other network-accessible resources. Applications can include for example social media or messaging applications or platforms for example Facebook™, LinkedIn™, and Google™. Applications can further include plugins, add-ons, or extensions to existing applications, for example browser plugins. Applications or components thereof can be installed locally on a computing device 12 or on computing systems accessible to the computing device 12 via a communications network 8, for example the Internet. The data sharing permissions can be set for a particular application, website, or webpage by the privacy manager 20 via an application settings API 44 which communicates permissions to an application server 40 enabling local applications 52 or network-based applications, webpages, or services accessible via a web browser 50 or a component of a local application 52. Subsequent changes by the user to data sharing permissions for particular applications, websites, or webpages are logged by the settings agent 14 and communicated to the privacy manager 20 via the settings API 30. Statistics of the user changes are used by the modeling engine 22 to build data-driven statistical models of privacy preference stored in the model datastore 24 of the privacy manager or the local datastore 54 of the computing device 12.

Figure 2A:
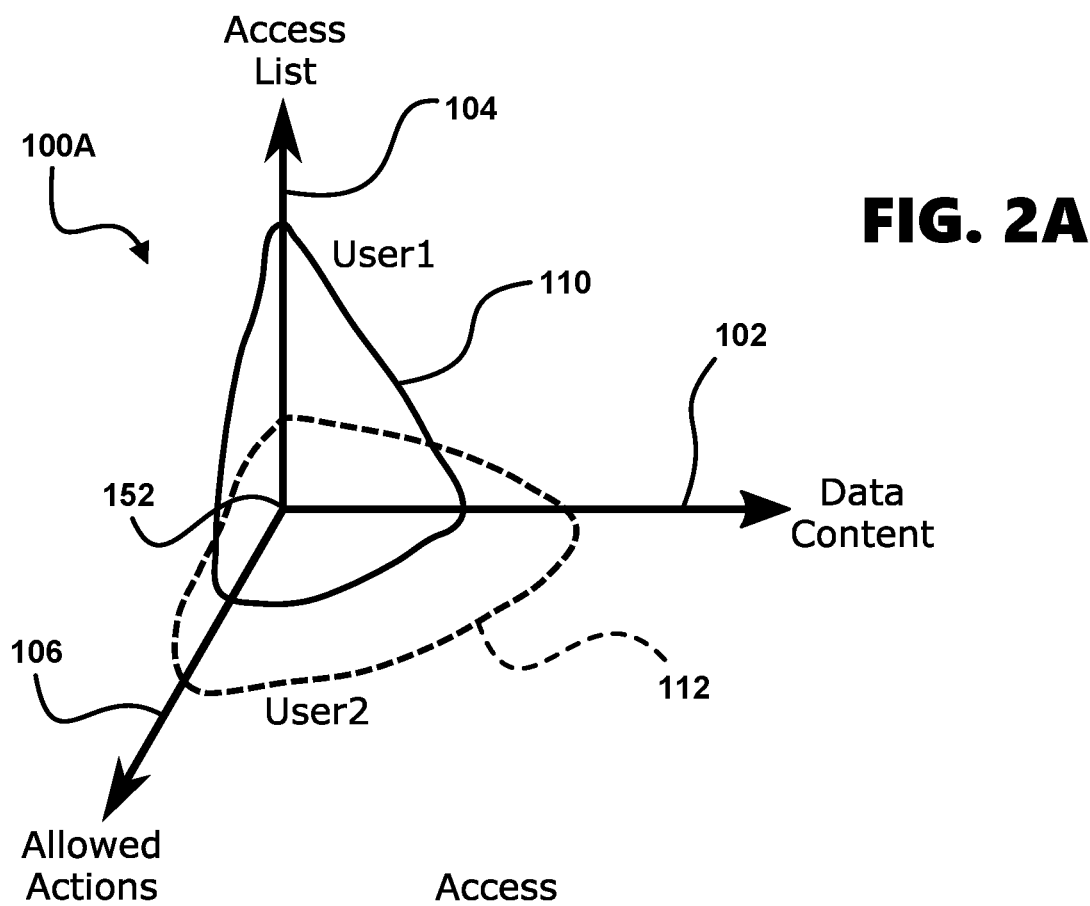

The modeling engine 22 enables modeling users' privacy preferences into a common scale. From the common scale, user privacy preferences are mapped into different privacy settings for a plurality of different applications, websites, and webpages. The privacy manager 20 monitors privacy settings of a plurality of applications, websites, and webpages for example via an application interface 34 in communication with application settings APIs 44. The privacy manager 20 is configured to define, model, and manage user's privacy preferences in at least three dimensions, for example corresponding to three axes. Referring to FIG. 2A, an exemplary model 100A generated by the modeling engine 22 shows exemplary first and second multidimensional zones 110, 112 (first and second "privacy comfort zones") in a multidimensional space reflecting respective exemplary privacy preferences of a particular first user and a particular second user. A first axis ("data content axis") 102 in the multidimensional space is indicative of which data a user is willing to share, for example contact data, photos, device location, and passwords. A second axis ("access list axis") 104 is indicative of with which recipients the user is willing to share the data that the user is willing to share, for example which network destinations, websites, applications, or companies. A third axis ("allowed actions axis") 106 is indicative of what actions are allowed with the data by the recipients of the data, for example share the data with others, build a product using the data, or monetize the data in some manner. The first privacy comfort zone 110 for the first user is based on preference data acquired from the first user, and the second privacy comfort zone 112 for the second user is based on preference data acquired from the second user.

Figure 2B:
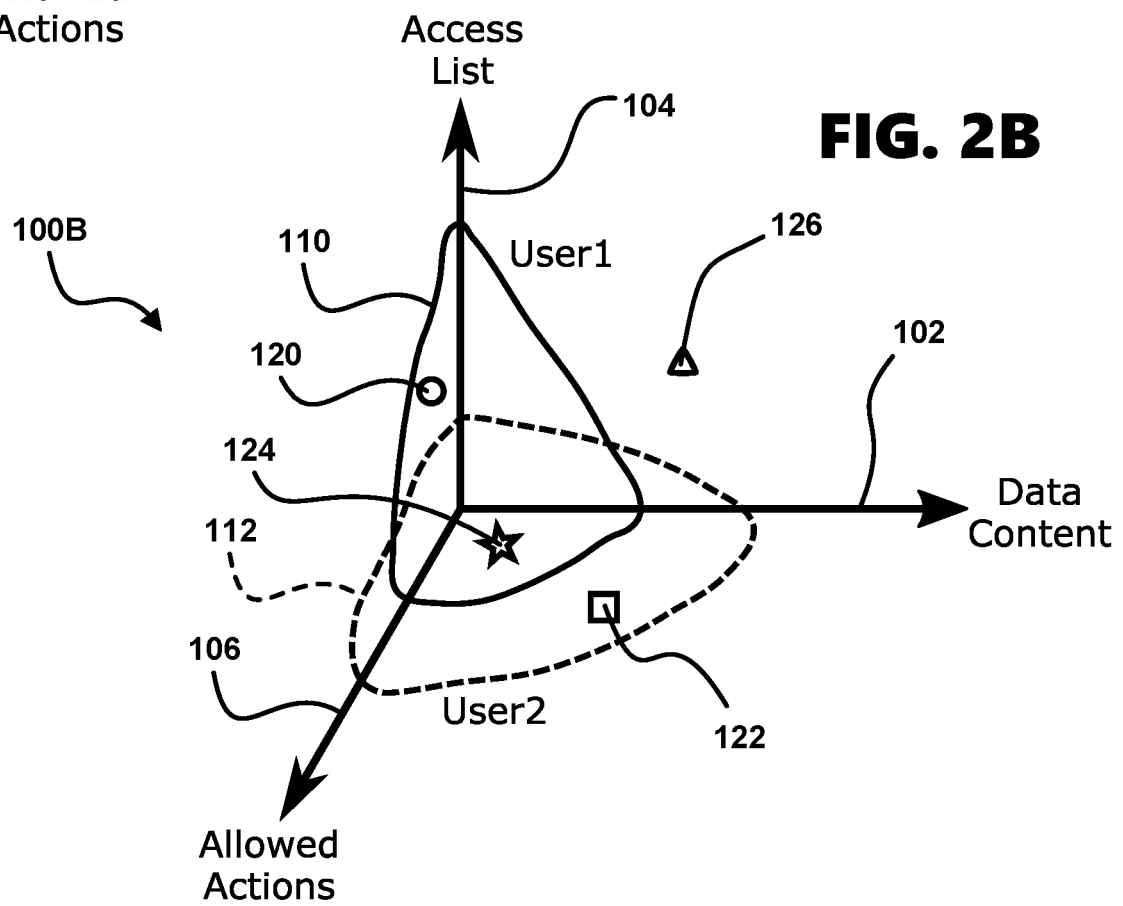
Figure 3A:
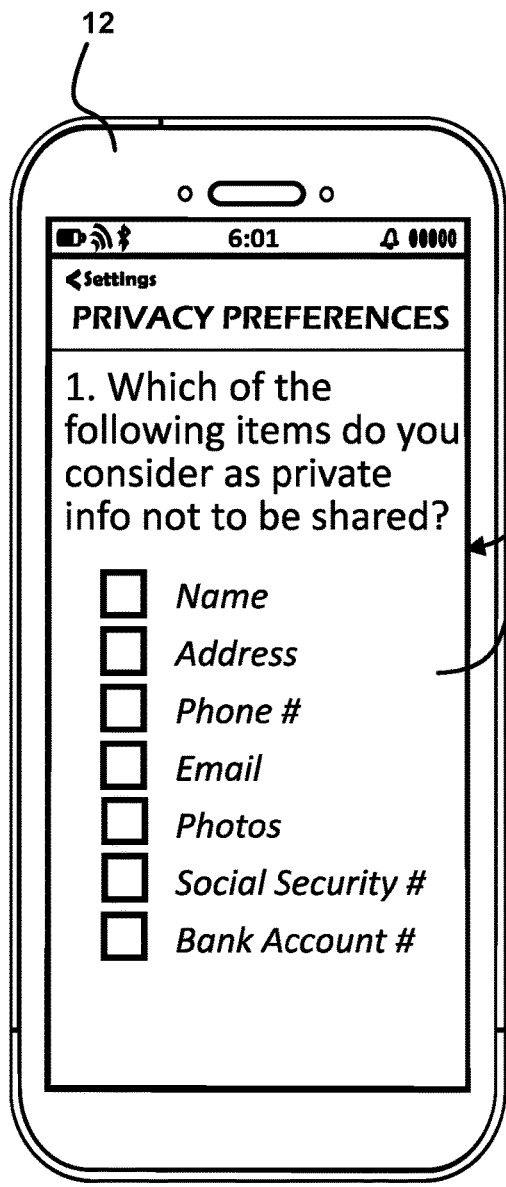
FIGS. 3A-3B show example interactive displays on a computing device for entering and editing privacy preferences.
Figure 3B:
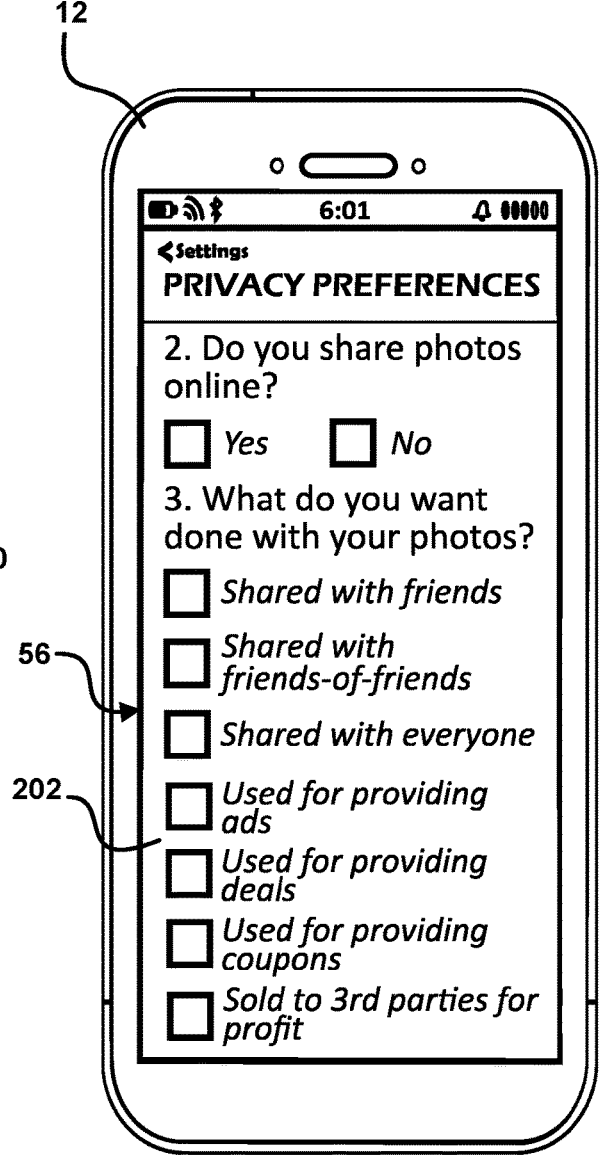

A set of queries are provided to a user to gather data required to model the user's privacy comfort zones. The queries are generated by the settings agent 14 or the web application 28 via the user interface 56 of the computing device 12. Referring to FIGS. 3A and 3B, exemplary interactive displays 200 and 202 provide queries and enable a user to input query responses which are then used by the modeling engine 22 to determine a privacy comfort zone for the user. In a first exemplary interactive display 200 a generated first query reads: "Which of the following items do you consider as private info not to be shared?" The first exemplary interactive display 200 enables actuatable boxes for selecting information not to be shared including user name, address, phone number, email address, photos, social security number, and bank account number. A response to the first query provides indications of data a user is willing to share, and can for example be used to define values in a dimension defined by the first axis 102 of the multidimensional spaces referred to in FIGS. 2A through 2F.

In a second exemplary interactive display 202, a generated second query reads: "Do you share photos online?" The user is enabled to input a response of "Yes" or "No" via actuatable boxes. A response to the second query provides an indication of recipients the user is willing to share the data with, and can for example be used to define values in a dimension defined by the second axis 104 of the multidimensional space referred to in FIGS. 2A through 2F. More specific queries can follow, for example asking if a user is willing to share photos with anyone, with friends only, or with friends and friends of friends only, which responses can also be used to define values in a dimension defined by the second axis 104. A generated third query reads: "What do you want done with your photos?" The second exemplary interactive display 202 enables actuatable boxes for inputting responses to the third query including shared with friends, shared with friends, shared with friends-of-friends, shared with everyone, used for providing ads, used for providing deals, used for providing coupons, or sold to third parties for profit. Inputs in response to the third query provide indications of recipients the user is willing to share the data with and actions allowed with the data by the recipients of the data, which inputs can for example be used to define values respectively in the dimension defined by the second axis 104 and the dimension defined by the third axis 106 of the multidimensional spaces referred to in FIGS. 2A-2F.

As described herein, user query responses are used to determine a user's privacy comfort zone along each of a plurality of axes. While the first and second privacy comfort zones 110, 112 of FIG. 2A-2C are shown along three perpendicular axes 102, 104, 106 for visualization, each of the axes can include a multidimensional vector not restricted to the geometry of FIGS. 2A-2F. As such, the privacy comfort zone can be expressed as a combined multidimensional vector. The three perpendicular axes 102, 104, 106 can be representative of a data content vector (the data content axis 102), an access list vector (the access list axis 104), and an allowed actions vector (the allowed actions axis 106) which when combined yield the first privacy comfort zone 110 or the second privacy comfort zone 112.

A user's responses to queries generated by the settings agent 14 or the web application 28 can correspond to point values for computing vectors for defining a multidimensional zone ("privacy comfort zone") corresponding to the user. Referring to Table 1, for each of the listed data types a user is willing to share, a point value is allocated to a data content vector for the user. For example, if a user is willing to share the user's name (1 point), address (2 points), email address (2 points) and bank account number (4 points), the user's data content vector can be calculated as <(1+2+2+4), 0,0> or <9,0,0>. Referring to Table 2, for each of the listed recipients with which the user is willing to share data, a point value is allocated to an access list vector for the user. For example, if the user is willing to share data online (1 point), with friends (1 point) and with friends of friends (2 points) and with everyone (3 points), the user's access list vector can be calculated as <0,(1+1+2+3),0> or <0,7,0>. Referring to Table 3, for each of the listed allowed actions for the data, a point value is allocated to an allowed actions vector for the user. For example, if a user is willing to allow data to be used for providing ads to user (1 point), for providing deals to user (2 points), and for providing coupons to user (2 points), the user's allowed actions vector can be calculated as <0,0,(1+2+2)> or <0,0,5>.

TABLE 1

| Data willing to share | Pts. |
| --- | --- |
| Name of user | 1 |
| Address of user | 2 |
| Phone # of user | 2 |
| Email address of user | 2 |
| User's photos | 3 |
| Social Sec. # of user | 4 |
| Bank Acct. # of user | 4 |
| Location of user (e.g., via device GPS) | 4 |
| Health information of user | 4 |

TABLE 2

| Willing to share with who/what/where | Pts. |
| --- | --- |
| Online | 1 |
| With friends of user | 1 |
| With friends of friends of user | 2 |
| With everyone | 3 |

TABLE 3

| Allowed actions with data | Pts. |
| --- | --- |
| Used for providing ads to user | 1 |
| Used for providing deals to user | 2 |
| Used for providing coupons to user | 2 |
| Sold to $3^{rd}$ parties for profit | 4 |

The multidimensional zone defining a particular user's privacy comfort level ("privacy comfort zone") can be defined for example by the magnitude of a resultant vector of a combination of the user's data content vector, access list vector, and allowed actions vector. Referring to FIG. 2D, in an exemplary model 100D a multidimensional zone 150 is modeled as a half of a spherical wedge of $\pi/2$ radians bound by the planes defined by the three axes 102, 104, 106, having a center at the origin 152 of the axes 102, 104, 106, and having a radius 154, which is the magnitude of the combination of the user's data content vector, access list vector, and allowed actions vector. The multidimensional zone 150 is accordingly radially symmetric within the area bound by the planes defined by the three axes 102, 104, 106. Referring to the example user data described above, the resultant vector of the combination of the exemplary data content vector of <9,0,0>, access list vector of <0,7,0>, and allowed actions vector of <0,0,5> is <9,7,5> which corresponds to a magnitude of $(9^2+7^2+5^2)^{1/2}$, about twelve point four five (12.45), which value can be used to define the radius 154 of the multidimensional zone 150.

The privacy comfort zone need not be radially symmetrical or regularly shaped as shown and described with reference to FIG. 2D. A radially asymmetric or irregular privacy comfort zone can be modeled based on which data a user is willing to share, with which recipients the user is willing to share the data that the user is willing to share, and what actions are allowed with the data by the recipients of the data. For example, referring to FIG. 2A, the first privacy comfort zone 110 allows for a relatively greater radial distance from the origin 152 along the access list axis 104 as compared with the radial distance from the origin 152 along the data content axis 102 or the allowed actions axis 106. This suggests that the first user is relatively liberal regarding allowing specified data to be shared with many recipients, but the first user is more conservative regarding which data the first user is willing to share and what actions are allowed with the data by the recipient. The second privacy comfort zone 112 allows for a relatively greater radial distance from the origin 152 along the data content axis 102 and the allowed actions axis 106 as compared with the radial distance from the origin 152 along the access list axis 104. This suggests that the second user is relatively liberal regarding which data the second user is willing to share and what actions are allowed with the data by the recipient as compared with the second user's conservative preferences regarding with which recipients the data may be shared.

The privacy comfort zone need not be defined as continuous or extending from an origin of a system of coordinate axes. Referring to FIGS. 2E and 2F, in an exemplary model 100E, a discontinuous three-dimensional zone ("discontinuous privacy comfort zone") 170 is modeled based on vectors or line segments plotted along each of the axes 102, 104, 106. Select data types, for example those listed in Tables 1, 2, and 3, are respectively assigned locations on the data content axis 102, the access list axis 104, and the allowed actions axis 106. A check mark represents data a user is willing to share, an allowed recipient, or an allowed action. An "X" mark represents data a user is not willing to share, a non-allowed recipient, or a non-allowed action. For each of the listed data types a user is willing to share, a vector or line segment 160 is assigned to a position on the data content axis 102. For each of the listed recipients with which the user is willing to share data, a vector or line segment 162 is assigned to a position on the access list axis 104. For each of the listed allowed actions by the user for the data, a vector or line segment 164 is assigned to a position on the allowed actions axis 106. The discontinuous privacy comfort zone 170 is bound by the planes defined by the three axes 102, 104, 106 and is defined by the line segments 160, 162, 164. The discontinuous privacy comfort zone 170 is defined along a first plane defined by the data content axis 102 and the access list axis 104 by first planar surfaces 180, and defined along a second plane defined by the access list axis 104 and the allowed actions axis 106 by second planar surfaces 182, and defined along a third plane defined by the allowed actions axis 106 and the data content axis 102 by third planar surfaces 184. A first convex surface 172 aligns with the outermost edges of the first, second and third planar surfaces 180, 182, 184. A concave surface 174 aligns with internal edges of the first, second and third planar surfaces 180, 182, 184. A second convex surface 176 aligns with other internal edges of the first, second and third planar surfaces 180, 182, 184. A void 178 in the discontinuous privacy comfort zone 170 is created between the concave surface 174 and the second convex surface 176.

Initially, a user's privacy comfort zone is determined by the modeling engine 22 or the settings agent 14 based on the user's responses to queries related to the user via the user interface 56. After collecting query responses from multiple users via multiple computing devices 12 and then logging manual changes by the multiple users to data sharing permissions for particular applications, websites, and webpages the modeling engine 22 is enabled to build data-driven statistical models of privacy preference, which models can be stored in the model datastore 24 or the local datastore 54. The modeling engine 22 or the settings agent 14 can then provide a limited set of queries to a particular user and generate the privacy comfort zone for the particular user based on the limited set of queries and the privacy comfort zones of other users having similar identifying information (e.g., age, income, profession, residence location, work location, family status).

After a privacy comfort zone is determined for a particular user, the modeling engine 22 or the settings agent 14 determines whether the expected use by one or more applications or one or more websites or webpages of the particular user's data is compliant with the particular user's privacy comfort zone. Applications can include for example local applications 52 or network-based or web-based applications or services hosted by application servers 40 and accessible via browsers 50 or local applications 52. To make compliance determinations the privacy manager 20 can access one or more of manifests, end user license agreements ("EULAs"), terms of use, or privacy settings of applications and websites or webpages, for example rendered available to the privacy manager 20 via application settings APIs 44 of the applications. Applications installed on mobile devices ("mobile applications") often set forth available privacy settings in manifests or EULAs accompanying the applications. Applications embodied as web services often set forth available privacy settings in EULAs and render privacy settings available through application settings APIs 44. Since privacy settings of an application or website are often selectable by a user, whether or not an application or website is compliant with a privacy comfort zone can be dependent on the data sharing permissions set by the user via the application's privacy settings. Data sharing permissions for an application or website can be set automatically by the privacy manager 20 to comply with a user's privacy comfort zone by communication with the application's or website's application settings API 44 via the application interface 34. Further, a user can typically manually adjust the data sharing permissions for an application or website via a local application 52 or by a browser 50 via an application server 40.

A multidimensional coordinate is determined for an application, website, or webpage by the modeling engine 22 based on default, available, or fixed privacy settings of the application, website, or webpage, for example privacy settings accessed in a manifest, terms of service, or EULA accessible via an application settings API 44 for the application, website, or webpage. Beneficially, a multidimensional coordinate, which can be expressed as a vector, is defined by a first position vector indicative of which data an application, website, or webpage will share, for example contact data, photos, device location, or passwords, a second position vector indicative of with which recipients the application, website, or webpage will share the data, for example which network destinations, websites, applications, user contacts, or companies, and a third position vector indicative of what actions with the data are allowed by the application, website, or webpage, for example sharing the data with others, building a product using the data, or monetizing the data in some manner. The modeling engine 22 or settings agent 14 compares the multidimensional coordinate with a privacy comfort zone of a user to determine if the multidimensional coordinate is within the privacy comfort zone of the user.

Referring again to Tables 1, 2, and 3 a multidimensional coordinate corresponding to a particular exemplary application is determined by the modeling engine 22 based on default, available, or fixed privacy settings of the application. Referring to Table 1, for each of the listed data types an application, website, or webpage is configured to share (based on default, available, or fixed privacy settings) a point value is allocated to a data content vector for the application, website, or webpage. For example, if an application is configured to share the user's name (1 point), address (2 points), phone number (2 points), and photos (3 points), the exemplary application's data content vector can be calculated as <(1+2+2+3),0,0> or <8,0,0>. Referring to Table 2, for each of the listed recipients with which an application, website, or webpage is configured to share data, a point value is allocated to an access list vector for the application, website, or webpage. For example, if an application is configured to share data online (1 point), with a user's friends (1 point), and with a user's friends of friends (2 points), the exemplary application's access list vector can be calculated as <0,(1+1+2),0> or <0,4,0>. Referring to Table 3, for each of the listed allowed actions by an application, website, or webpage for the data, a point value is allocated to an allowed action vector for the application, website, or webpage. For example, if an application is configured to allow data to be used for providing ads to a user (1 point), for providing deals to a user (2 points), for providing coupons to a user (2 points), and for selling a user's data to $3^{rd}$ parties for profit (4 points), the application's allowed actions vector can be calculated as <0,0,(1+2+2+4)> or <0,0,9>. The resultant position vector, or stated alternatively the multidimensional coordinate, of the combination of the application data content position vector of <8,0,0>, access list position vector of <0,4,0>, and allowed actions vector of <0,0,9> is <8,4,9> for the exemplary application. This corresponds to a vector magnitude of $(8^2+4^2+9^2)^{1/2}$, which equals about 12.69. The exemplary application's resultant position vector can be compared for example with the multidimensional zone defined by the above-described exemplary user's resultant vector of <9,7,5>, corresponding to a magnitude of $(9^2+7^2+5^2)^{1/2}$, which equals about 12.45. The resultant position vector of the exemplary application having magnitude of about 12.69 extends outside of the exemplary user's multidimensional zone ("privacy comfort zone") defined by the exemplary user's resultant vector having a magnitude of about 12.45.

Alternatively, referring to FIGS. 2E and 2F, select data types can be assigned locations on the data content axis 102, the access list axis 104, and the allowed actions axis 106, and one or more multidimensional coordinates for an application, website, or webpage can be generated based on default, available, or fixed privacy settings of the application, website, or webpage. For example, if an application is only configured to share a user's email address with recipients specified by the user and to use the user's email address for providing the user with coupons, a multidimensional coordinate 190 within the user's discontinuous privacy comfort zone 170 is determined based on the respective assigned locations of those data types on the data content axis 102, the access list axis 104, and the allowed actions axis 106. The multidimensional coordinate 190 is positioned between the first convex surface 172 and the concave surface 174 within the user's privacy comfort zone 170. If an application is configured to share a user's phone number with anyone and use user data for deals and ads, a multidimensional coordinate 192 outside the user's discontinuous privacy comfort zone 170 is calculated based on the respective assigned locations of those data types on the data content axis 102, the access list axis 104, and the allowed actions axis 106. The multidimensional coordinate 192 is positioned between the concave surface 174 and the second convex surface 176 in the void 178.

Referring to FIG. 2B, an exemplary model 100B includes exemplary multidimensional coordinates based on exemplary privacy settings of a plurality of different applications. A first multidimensional coordinate 120, which can be defined by a position vector, resides within the first privacy comfort zone 110 of the first user, but not within the second privacy comfort zone 112 of the second user. Data sharing permissions of privacy settings of a first application are used by the modeling engine 22 to locate the first multidimensional coordinate. A second multidimensional coordinate 122 resides within the second privacy comfort zone 112 of the second user, but not within the first privacy comfort zone 110 of the first user. Data sharing permissions of privacy settings of a second application are used by the modeling engine 22 to locate the second multidimensional coordinate 122. A third multidimensional coordinate 124 resides within both the first privacy comfort zone 110 of the first user and the second privacy comfort zone 112 of the second user. Data sharing permissions of privacy settings of a third application are used by the modeling engine 22 to locate the third multidimensional coordinate 124. A fourth multidimensional coordinate 126 resides neither within the first privacy comfort zone 110 of the first user nor within the second privacy comfort zone 112 of the second user. Data sharing permissions of privacy settings of a fourth application are used by the modeling engine 22 to locate the fourth multidimensional coordinate 126. Based on an application's vector-defined multidimensional coordinate position relative to a user's privacy comfort zone, the privacy manager 20 can make changes to the user's data sharing permissions for the application via an application settings API 44, for example to bring the multidimensional coordinate corresponding to the application into the user's privacy comfort zone. Alternatively, the privacy manager 20 via the settings agent 14 can provide a notification to the user via the user interface 56 indicating that the application's default, available, user-selected, or fixed privacy settings are outside or within the user's privacy comfort zone.

Figure 3C:
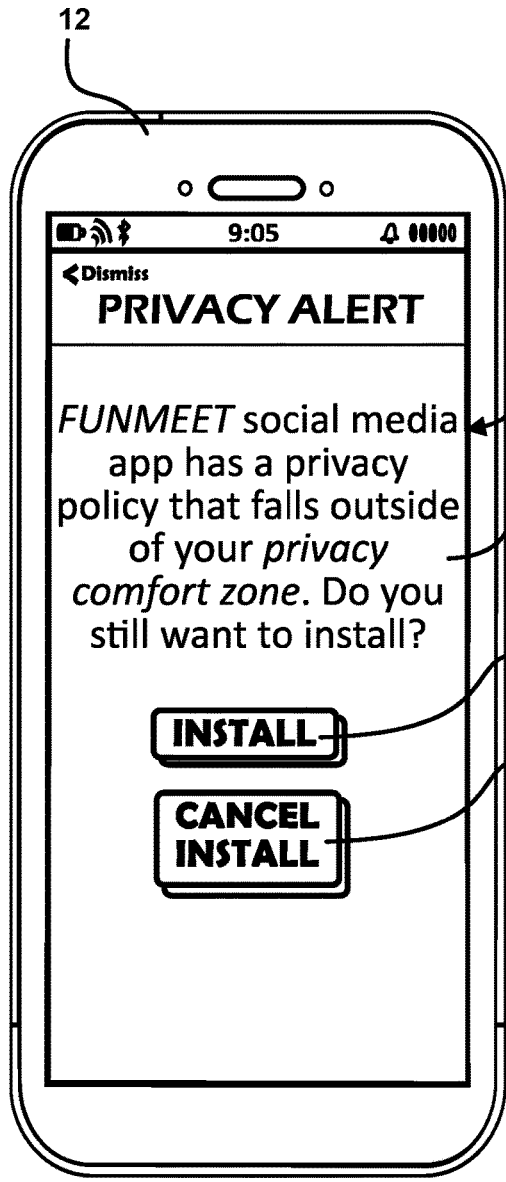

Referring to FIG. 3C, a third exemplary interactive display 210 includes a notification to a particular user provided via the settings agent 14. The notification describes a comparing of a multidimensional coordinate determined by the modeling engine 22 based on data sharing permissions of a particular application with the privacy comfort zone of the particular user. The notification is generated responsive to downloading the particular application from an application repository 42 or attempting to install the application on the computing device 12. The notification indicates: "FUNMEET social media app has a privacy policy that falls outside of your privacy comfort zone. Do you still want to install." An install button 212 is provided in the third exemplary interactive display 210 for actuation by a user to trigger installation of the "FUNMEET" social media application via the operating system 60. A cancel install button 214 is provided in the third exemplary interactive display 210 for actuation by a user to cancel installation of the "FUNMEET" social media application.

Figure 3D:
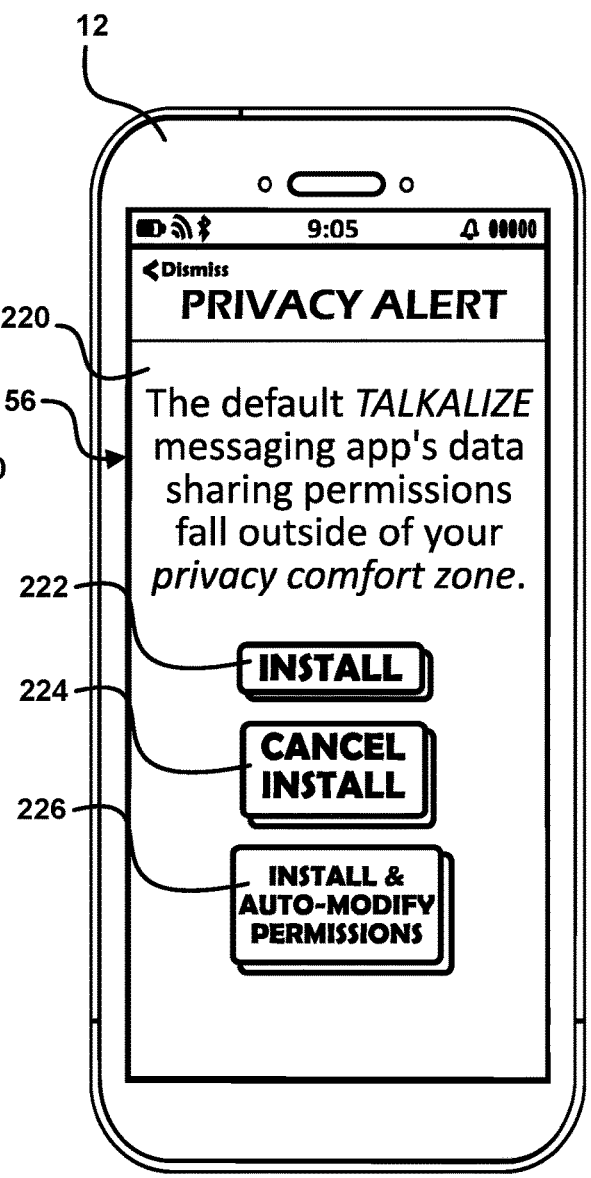

Referring to FIG. 3D, a fourth exemplary interactive display 220 includes a notification to a particular user provided via the settings agent 14. The notification describes a comparing of a multidimensional coordinate determined by the modeling engine 22 based on data sharing permissions of an exemplary "TALKALIZE" messaging application with the privacy comfort zone of the particular user. The notification of the fourth exemplary interactive display 220 is generated responsive to downloading the exemplary messaging application from an application repository 42 or attempting to install the application on the computing device 12. The notification indicates: "The default TALKALIZE messaging app's data sharing permissions fall outside of your privacy comfort zone." An install button 222 is provided in the fourth exemplary interactive display 220 for actuation by a user to trigger installation of the exemplary messaging application via the operating system 60. A cancel install button 224 is provided in the fourth exemplary interactive display 220 for actuation by a user to cancel installation of the exemplary messaging application. An install and auto-modify permissions button 226 is provided in the fourth exemplary interactive display 220 to install the application via the operating system 60 and then signal the privacy manager 20 to automatically change the data sharing permissions of the messaging application from the default settings (e.g., via the application settings API 44) to settings including data sharing permissions within the user's privacy comfort zone.

Figure 3E:
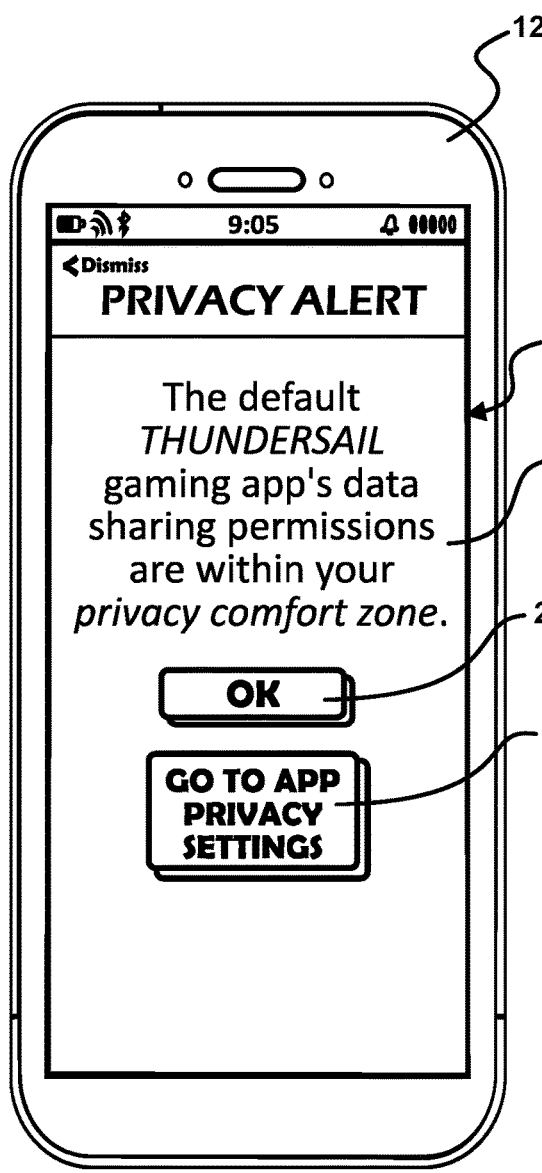

Referring to FIG. 3E, a fifth exemplary interactive display 230 includes a notification to a particular user provided via the settings agent 14. The notification describes a comparing of a multidimensional coordinate determined by the modeling engine 22 based on data sharing permissions of an exemplary "THUNDERSAIL" gaming application with the privacy comfort zone of the particular user. The notification of the fifth exemplary interactive display 230 is generated responsive to downloading from an application repository 42, installing, or attempting to install the application on the computing device 12. The notification indicates: "The default THUNDERSAIL gaming app's data sharing permissions are within your privacy comfort zone." An OK button 232 is provided in the fifth exemplary interactive display 230 for actuation by a user to trigger installation of or enable use of the exemplary gaming application via the operating system 60. A go to app privacy settings button 234 is provided in the fifth exemplary interactive display 230 to re-direct the user to a local or network-based privacy settings interface enabled by the exemplary gaming application to change the data sharing permissions of the gaming application from the default data sharing permissions.

Changes over time in the data sharing permissions of the privacy settings of applications, websites, and webpages are monitored by the privacy manager 20 or settings agent 14. These changes may be the result for example of application updates or purposeful or inadvertent changes to the application's, website's, or webpage's data sharing permissions made by the user. A monitored change in the data sharing permissions of the privacy settings of an application, website, or webpage results in shifting of the modeled location of the multidimensional coordinate associated with the application, website, or webpage as determined by the settings agent 14 or the modeling engine 22. Referring to FIG. 2C, in an exemplary model 100C exemplary shifts in the determined positions of the first and second multidimensional coordinates 120, 122 are shown. The first multidimensional coordinate 120 is determined to shift position as shown by the first arrow 130 based on a monitored change in data sharing permissions of privacy settings of the first application. Since the shifted position of the first multidimensional coordinate is still within the first privacy comfort zone 110, no user notification or action is required. The second multidimensional coordinate 122 is determined to shift position as shown by the second arrow 132 based on a monitored change in data sharing permissions of privacy settings of the second application. Since the shifted position of the second multidimensional coordinate 122 is not within the second privacy comfort zone 112, the settings agent 14 beneficially enables a notification to the second user or requests action from the second user.

Figure 3F:
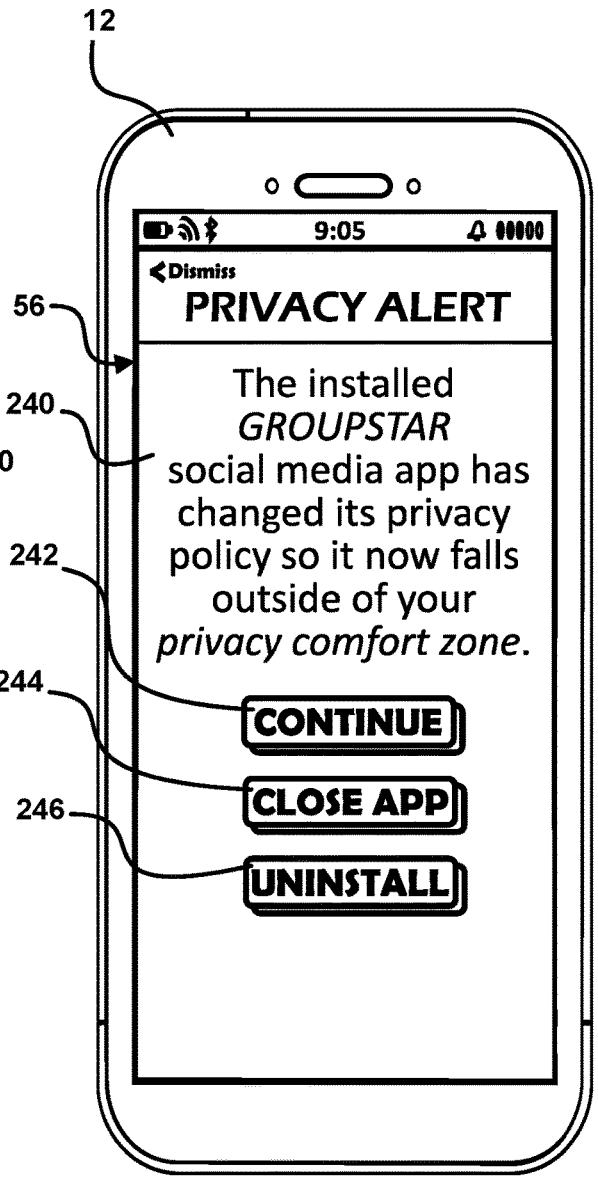

Referring to FIG. 3F, a sixth exemplary interactive display 240 includes a notification to a particular user provided via the settings agent 14. The notification describes a comparing of a multidimensional coordinate determined by the modeling engine 22 based on changed data sharing permissions of an exemplary "GROUPSTAR" social media application with the privacy comfort zone of the particular user. The notification is generated responsive to a recent change in the privacy policy of the exemplary social media application. The notification indicates: "The installed GROUPSTAR social media app has changed its privacy policy so it now falls outside of your privacy comfort zone." A continue button 242 is provided in the sixth exemplary interactive display 240 for actuation by a user to acknowledge the notification. A close application button 244 is provided in the sixth exemplary interactive display 240 for actuation by a user to close the "GROUPSTAR" social media application via the operating system 60, for example in response to the user's dissatisfaction with the changed privacy policy. An uninstall application button 246 is provided to enable uninstalling of the "GROUPSTAR" social media application via the operating system 60, for example in response to the user's dissatisfaction with the changed privacy policy.

A user can receive notifications regarding whether data sharing permissions of an application, website, or webpage fall outside their privacy comfort zone or the privacy comfort zones of other users. Referring to FIG. 3G, a seventh exemplary interactive display 250 includes a notification to a particular user via the settings agent 14 a computing device 12 which describes a comparing of a multidimensional coordinate determined based on data sharing permissions of a particular application with privacy comfort zones of a plurality of other users of the settings agent 14 on other computing devices 12. The notification of the seventh exemplary interactive display 250 is generated by the settings agent 14 responsive to downloading the application from an application repository 42 or attempting to install the application on the computing device 12. The notification indicates: "The privacy policy of this app falls outside the privacy comfort zone of 75% of users. Think twice before installing." A go to app privacy settings button 252 is provided in the seventh exemplary interactive display 250 to re-direct the user to a local or network-based privacy settings interface enabled by the application to allow the user to manually change the data sharing permissions of the application from the default settings. An install and auto-modify permissions button 254 is provided to install the application via the operating system 60 and then signal the privacy manager 20 to automatically change the data sharing permissions of the application from the default settings (e.g., via the application settings API 44) to settings including data sharing permissions within the user's privacy comfort zone.

An application or website developer can register an account with the privacy manager 20 via a developer application program interface 32 and upload or provide a network link to data sharing permissions for example in the form of application manifests, EULAs, terms of service, or privacy settings via a developer system 16. The privacy manager 20 via the modeling engine 22 generates a multidimensional coordinate based on the uploaded data sharing permissions and compares the multidimensional coordinate with the privacy comfort zones of a plurality of users of the settings agent 14. A notification is provided to the developer system 16 based on the comparison. Referring to FIG. 3H, an eighth exemplary interactive display 260 includes an exemplary notification to a developer system 16 transmitted via the developer API 32, which notification describes a comparing of a multidimensional coordinate determined based on data sharing permissions provided by the developer with privacy comfort zones of a plurality of users of the settings agent 14 on computing devices 12. The notification is generated by the privacy manager 20 responsive to receiving uploaded data sharing permissions or receiving a network link to data sharing permissions via the developer system 16. The notification reads: "The policies of this app fall outside of the privacy comfort zone of 60% of users. Think about changing the privacy schemes." An OK button 262 is provided for actuation by a developer to acknowledge the notification. A see recommendations button 264 is provided for redirecting the developer to suggested changes to their data sharing permissions to better conform with privacy comfort zones of more users.

Figure 4:
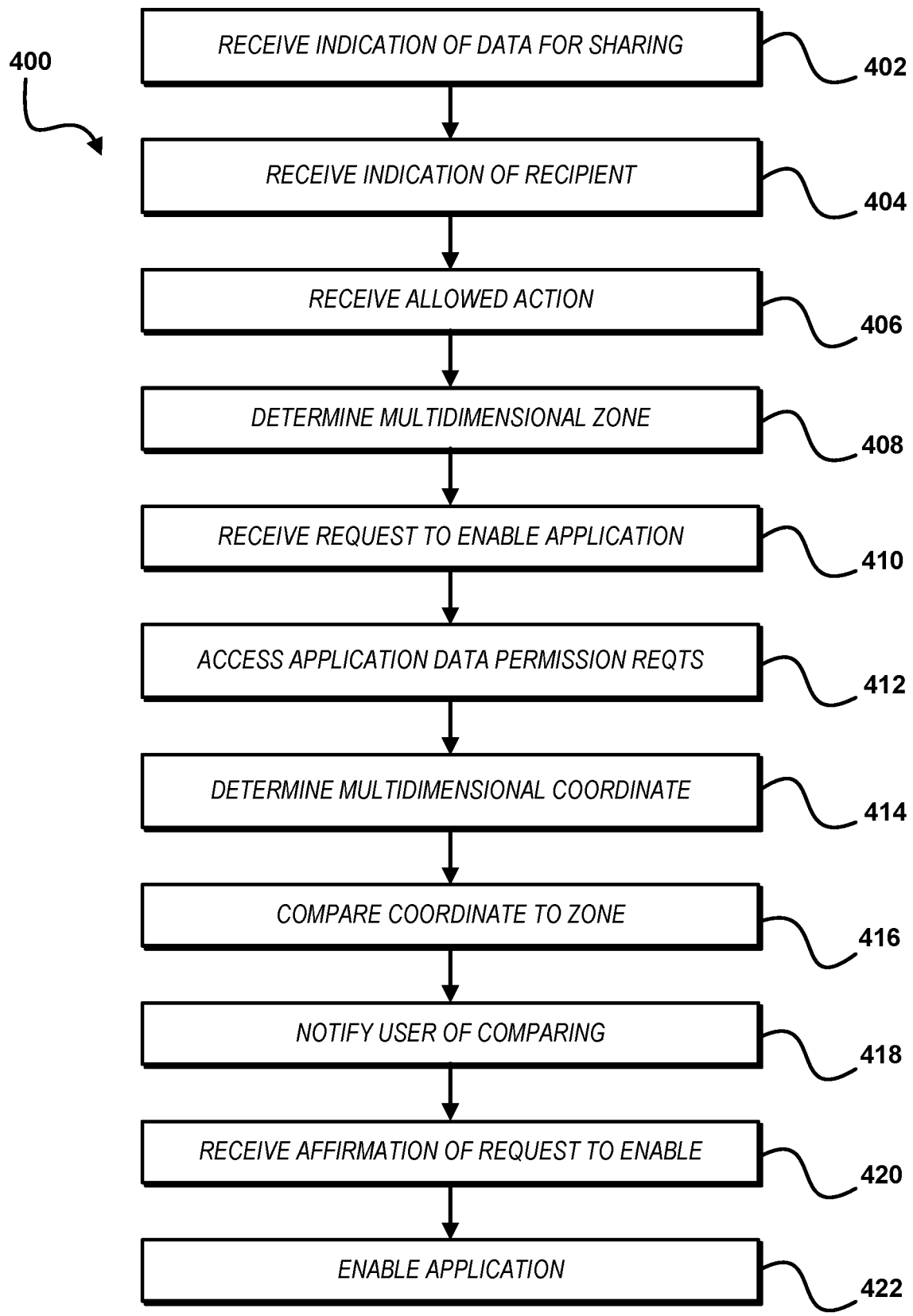
FIG. 4 is a flow chart showing a method for determining a multidimensional zone based on user privacy preferences and for enabling an application.

Referring to FIG. 4, a flowchart shows a method 400 of controlling enabling of an application. An alternative implementation of the method 400 can be used to control the enabling of access to websites and webpages within websites. The method 400 and associated processes are described with reference to the components of the system 10 shown in FIG. 1, including for example the computing device 12, the processor-enabled privacy manager 20, the settings agent 14, and the application settings API 44. Alternatively, the method 400 can be performed via other suitable systems.

The method 400 includes receiving from a particular user an indication of data for sharing (step 402), receiving from the particular user an indication of one or more recipients with which to share the data (step 404), and receiving from the particular user one or more allowed actions for the data (step 406). Beneficially the processor-enabled privacy manager 20 or settings agent 14 performs the receiving steps via a computing device 12. The indication of the one or more recipients can include for example one or more of an indication of network destinations for receiving the data, other applications for receiving the data, or other users for receiving the data. To receive the indications, the particular user can be queried via the computing device 12, and the indication of the data for sharing, the indication of the one or more recipients, and the one or more allowed actions for the data can be received via the user interface 56 of the computing device 12 responsive to the querying.

A multidimensional zone is determined based on the indication of the data for sharing, the indication of the one or more recipients, and the one or more allowed actions for the data (step 408). Beneficially, a first multidimensional vector is determined based on the indication of the data for sharing, a second multidimensional vector is determined based on the indication of the one or more recipients with which to share the data, and a third multidimensional vector is determined based on the one or more allowed actions for the data, and determining the multidimensional zone includes determining a combined multidimensional vector based on the first multidimensional vector, the second multidimensional vector, and the third multidimensional vector. For example, a first value can be determined on a first axis based on the indication of the data for sharing, a second value can be determined on a second axis based on the indication of the one or more recipients with which to share the data, and a third value can be determined on a third axis based on the one or more allowed actions for the data, and the multidimensional zone can be determined by determining a combined multidimensional vector based on the first value on the first axis, the second value on the second axis, and the third value on the third axis.

Alternatively, any two of steps 402, 404, and 406 can be performed to the exclusion of one of steps 402, 404, and 406, and the multidimensional zone can be determined based on two or more of the indication of the data for sharing, the indication of the one or more recipients, and the one or more allowed actions for the data, for example based on two or more of the first multidimensional vector, the second multidimensional vector, and the third multidimensional vector.

A request is detected from the particular user to enable a particular application via a computing device 12 (step 410). Such request can include any action to install or execute an application. The settings agent 14 can monitor the enabling of applications via the operating system 60 of the computing device 12 to detect requests. Data permission requirements of the particular application are accessed (step 412), and a multidimensional coordinate is determined based on the data permission requirements of the particular application (step 414). Alternatively, a request to access a particular website or webpage is detected, data permission requirements of the particular website or webpage are accessed, and a multidimensional coordinate is determined based on the data permission requirements of the particular website or webpage. The accessing of the data permission requirements of the particular application or particular website or webpage can include accessing one or more of a manifest of the particular application, an end-user license agreement ("EULA") of the particular application, terms of service of the particular website or webpage, or privacy settings of the particular application. Further, the accessing of the data permission requirements of the particular application or the particular website or webpage can include two or more of accessing of rules indicating information to be shared, accessing rules indicating targets of the information to be shared, and accessing rules indicating allowed actions for the information. Further, the multidimensional coordinate can be determined based on two or more of the information to be shared, the targets of the information to be shared, and the allowed actions for the information. For example, a first position vector can be determined based on the information to be shared, a second position vector can be determined based on the targets of the information to be shared, and a third position vector can be determined based on the allowed actions for the information. The multidimensional coordinate can be determined based on two or more of the first position vector, the second position vector, or the third position vector. The accessing of the rules indicating the targets of the information to be shared can include accessing rules indicating one or more of network destinations for receiving the information, other applications for receiving the information, or other users for receiving the information.

The multidimensional zone is compared to the multidimensional coordinate (step 416), and the particular user is notified via the computing device 12 of the comparing of the multidimensional zone to the multidimensional coordinate (step 418). The comparing of the multidimensional zone to the multidimensional coordinate can include determining that the multidimensional coordinate is outside of the multidimensional zone, and the notifying of the particular user can include notifying the particular user that the multidimensional coordinate is outside the multidimensional zone. A notification of this type is shown in the in the third exemplary interactive display 210 of FIG. 3C.

An affirmation of the request from the particular user is received via the computing device (step 420), and the particular application is enabled responsive to the affirmation of the request (step 422). Alternatively, access to a particular website or webpage is enabled. Enabling the particular application can include one or both of enabling installation of the particular application on the computing device or enabling execution or use of the particular application, which application can also be web-based or include network accessible services or components.

An extension of the method 400 can include receiving from a plurality of other users two or more of other indications of other data for sharing, other indications of other recipients with which to share the other data, or other allowed actions. Another multidimensional zone is determined based on two or more of the other indications of the other data, the other indications of the other recipients, or the other allowed actions. The other multidimensional zone is compared to the multidimensional coordinate, and the particular user is notified via the computing device 12 of the comparing of the other multidimensional zone to the multidimensional coordinate. A notification of this type is shown in the in the seventh exemplary interactive display 250 of FIG. 3G.

A further extension of the method 400 can include re-accessing the data permission requirements of the particular application or particular website or webpage, determining change in the data permission requirements of the particular application or particular website or webpage, re-determining the multidimensional coordinate based on the changed data permission requirements of the particular application or particular website or webpage, re-comparing the multidimensional zone to the re-determined multidimensional coordinate, and notifying the particular user via the computing device of the re-comparing. For example if the particular user had been initially notified regarding the multidimensional coordinate being within the multidimensional zone, for example as shown and described with reference to the fifth exemplary interactive display 230 of FIG. 3E, then after the re-comparing, the particular user can be notified regarding the re-determined multidimensional coordinate being outside of the multidimensional zone, for example as shown and described with reference to the sixth exemplary interactive display 240 of FIG. 3F.

Figure 5:
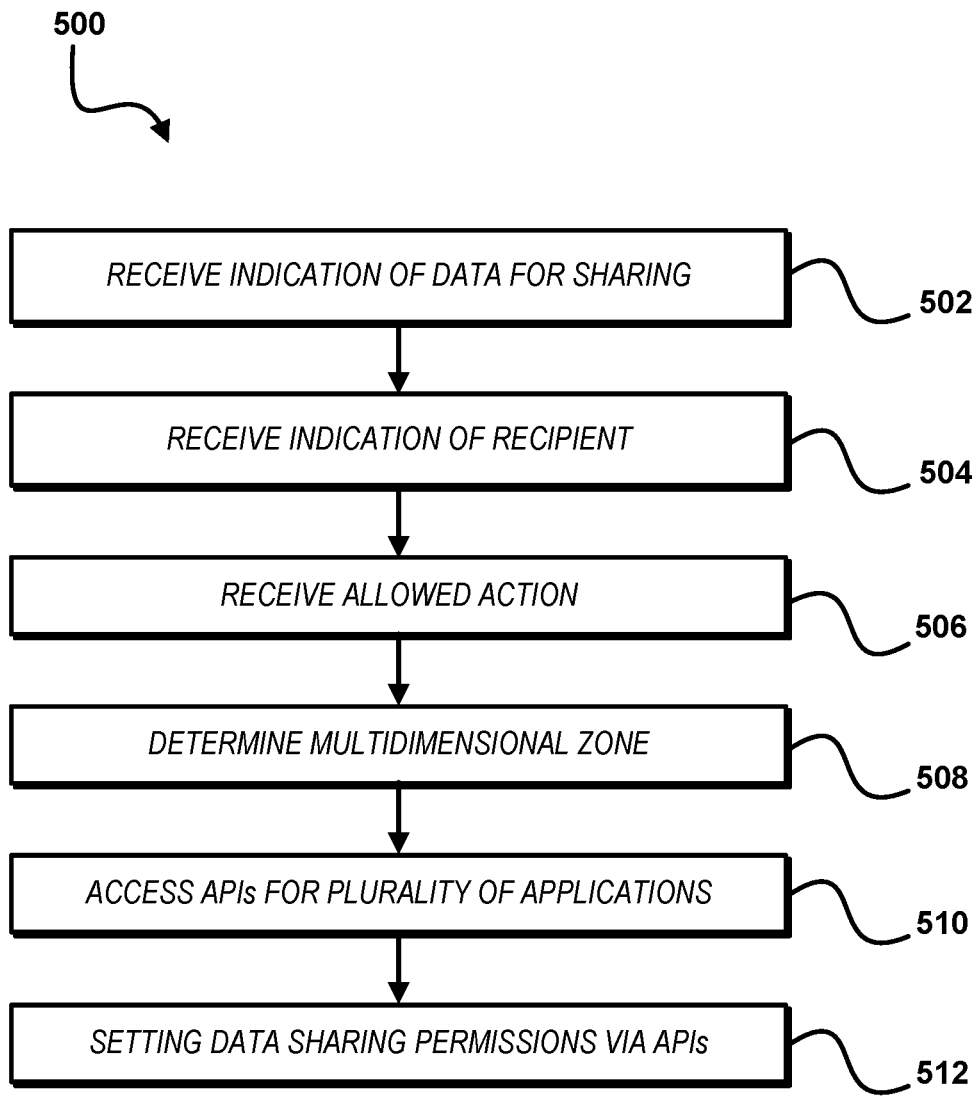
FIG. 5 is a flow chart showing a method for setting data sharing permissions for a plurality of applications.

Referring to FIG. 5, a flowchart shows a data control method 500. The method 500 and associated processes are described with reference to the components of the system 10 shown in FIG. 1, including for example the computing device 12, the processor-enabled privacy manager 20, the settings agent 14, and the application settings API 44. Alternatively, the method 500 can be performed via other suitable systems.

The method 500 includes a process for setting data sharing permissions for a user for a plurality of applications or websites or webpages. The method 500 includes two or more of receiving from a particular user an indication of data for sharing (step 502), receiving from the particular user an indication of one or more recipients with which to share the data (step 504), or receiving from the particular user one or more allowed actions for the data (step 506). Beneficially, the processor-enabled privacy manager 20 or settings agent 14 performs the receiving steps via a computing device 12. The indication of the data for sharing can include for example a name of the particular user, an address of the particular user, a telephone number of the particular user, an email address of the particular user, an identification number of the particular user, an indication of photos for sharing, an indication of contacts for sharing, or an indication of the location of a computing device 12 of the particular user for sharing. The indication of the data for sharing can also include an indication of data not for sharing. The indication of the one or more recipients can include for example an indication of a particular application with which to share the data, an indication to share the data via a network, or an indication of a network destination with which to share the data. The one or more allowed actions for the data can include for example an indication that the data can be shared by the one or recipients with other recipients, an indication that the data can be used by the one or more recipients in building an application or a service, an indication that the data can be used to enable transmission of advertisements, offers, or coupons to the particular user, and an indication that the data can be sold by the one or more recipients.

A multidimensional zone is determined based on two or more of the indication of the data for sharing, the indication of the one or more recipients, or the one or more allowed actions for the data (step 508). Beneficially, a first multidimensional vector is determined based on the indication of the data for sharing, a second multidimensional vector is determined based on the indication of the one or more recipients with which to share the data, and a third multidimensional vector is determined based on the one or more allowed actions for the data, wherein determining the multidimensional zone includes determining a combined multidimensional vector based on the first multidimensional vector, the second multidimensional vector, and the third multidimensional vector. For example, a first value can be determined on a first axis based on the indication of data for sharing, a second value can be determined on a second axis based on the indication of one or more recipients with which to share the data, and a third value can be determined on a third axis based on the one or more allowed actions for the data, wherein determining the multidimensional zone includes determining a combined multidimensional vector based on the first value on the first axis, the second value on the second axis, and the third value on the third axis.

A plurality of application program interfaces (APIs) for a plurality of applications are accessed via a network (step 510). Alternatively or additionally a plurality of application program interfaces (APIs) for a plurality of websites including a plurality of webpages are accessed via the network. Further, a manifest, an end-user license agreement ("EULA"), terms of service, or privacy settings can be accessed via an API of each of the plurality of applications or websites or via other network location, and the data sharing permissions can be set for the particular user further based on one or more of the manifest, the EULA, the terms of service, or the privacy settings of each of the plurality of applications or websites.

Data sharing permissions for the particular user for each of the plurality of applications, or alternatively each of the plurality of websites, are set based on the multidimensional zone of the particular user via the plurality of APIs (step 512). The setting of the data sharing permissions can include for example selecting predefined permissions via the plurality of APIs. Further, the setting of the data sharing permissions beneficially includes two or more of setting rules indicating information to be shared, setting rules indicating targets of the information to be shared, or setting rules indicating allowed actions for the data, wherein the setting of the rules includes establishing a multidimensional coordinate based on two or more of the information to be shared, the targets of the information to be shared, or the allowed actions for the data to be within the multidimensional zone. For example, a first position vector can be determined based on the information to be shared, a second position vector can be determined based on the targets of the information to be shared, and a third position vector can be determined based on the allowed actions for the information, wherein setting the rules includes establishing a multidimensional coordinate to be within the multidimensional zone based on the first position vector, the second position vector, and the third position vector. Alternatively, only two of the vectors can be used in establishing the multidimensional coordinate and setting the rules.

An extension of the method 500 can include determining a modification by the particular user of the data sharing permissions for a particular one of the plurality of applications or websites or webpages, and re-determining the multidimensional zone based on the modification of the data sharing permissions, and re-setting the data sharing permissions for the particular user for one or more others of the plurality of applications or websites or webpages based on the re-determined multidimensional zone via one or more of the plurality of APIs. For example, a user's modification to data sharing permissions for the Facebook™ social media application can be detected by the privacy manager 20 which can re-determine the user's multidimensional zone and re-set the user's data sharing permissions for the Twitter™ social media application via a Twitter™ settings API.

A further extension of the method 500 can include receiving identifying information of the particular user and receiving identifying information of a plurality of other users. The identifying information of the particular user and the identifying information of the plurality of other users are compared. A plurality of indications of information for sharing are received from the other users, a plurality of indications of recipients with which to share the information are received from the other users, and a plurality of allowed actions for the information are received from the other users. The multidimensional zone is determined further based on the plurality of indications of information for sharing from the other users, the plurality of indications of recipients with which to share the information from the other users, the plurality of allowed actions for the information from the other users, and the comparing of the identifying information of the particular user and the identifying information of the plurality of other users. In such a manner the multidimensional zone for a particular user can be based on the privacy preferences of other users having similar identifying information (e.g., age, income, profession, residence location, work location, family status).

Figure 6:
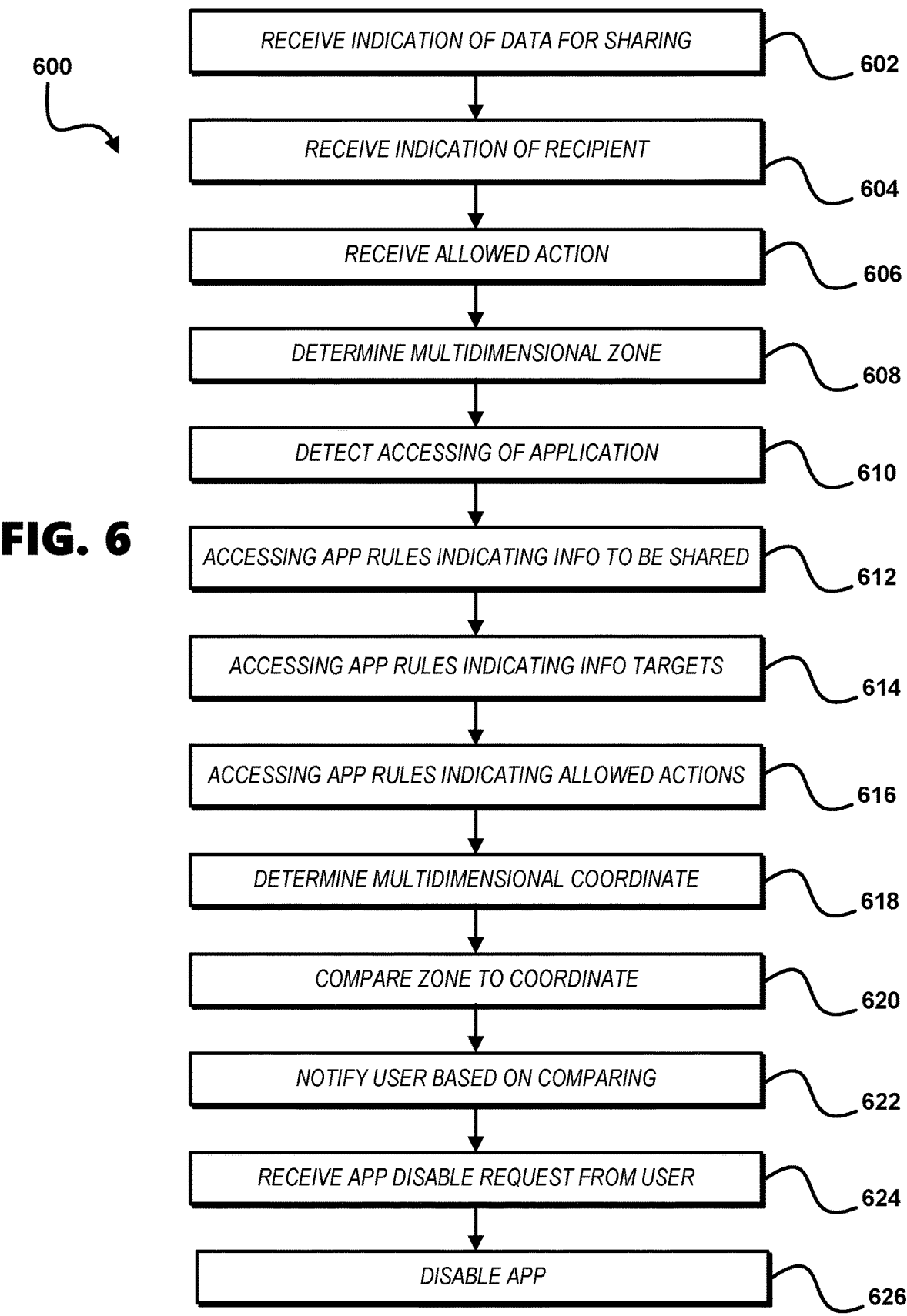
FIG. 6 is a flow chart showing a method for determining a multidimensional zone based on user privacy preferences and for disabling an application.

Referring to FIG. 6, a flowchart shows an application execution control method 600. The method 600 and associated processes are described with reference to the components of the system 10 shown in FIG. 1, including for example the computing device 12, the processor-enabled privacy manager 20, and the settings agent 14. Alternatively, the method 600 can be performed via other suitable systems. Further, in an alternative implementation of the method 600, access to websites or webpages can be controlled.

The method 600 includes at least two of: receiving from a user an indication of data for sharing (step 602), receiving from the user an indication of one or more recipients with which to share the data (step 604), or receiving from the user one or more allowed actions for the data (step 606). A multidimensional zone is determined based on at least two of: the indication of the data for sharing, the indication of the one or more recipients, or the one or more allowed actions (step 608). An accessing of a particular application by the user is detected via a computing device (step 610). The detecting of the accessing of the particular application can include detecting executing of the application on the computing device, detecting a request to install the application on the computing device, or detecting processes of the application between the computing device and a network-accessible server. Alternatively, an accessing of a particular website or webpage can be detected.

At least two of: rules for the particular application, website, or webpage indicating information to be shared (step 612), rules for the particular application, website, or webpage indicating targets of the information to be shared (step 614), or rules for the particular application, website, or webpage indicating allowed actions for the information (step 616) are accessed. The indication of the one or more recipients can include for example network destinations for receiving the data, other applications for receiving the data, or other users for receiving the data. A multidimensional coordinate is determined based on at least two of: the information to be shared, the targets of the information to be shared, or the allowed actions for the information (step 618). The multidimensional zone is compared to the multidimensional coordinate (step 620), a user is notified based on the position of the multidimensional coordinate relative to the multidimensional zone (step 622), and a request is received from the user to disable the particular application (step 624). Alternatively, a request is received from the user to block or discontinue access to or navigate away from a website, webpage or associated resources. The notification can include for example the notification provided in the sixth exemplary interactive display 240 via the settings agent 14. The request to disable the application can be received for example via a close application button 244 or an uninstall application button 246 enabled in the user interface 56 via the settings agent 14. The settings agent 14 can initiate a disabling of the application (step 626) responsive to the request of step 624, for example to close the particular application or uninstall the particular application via the operating system 60. Alternatively, the settings agent 14 can initiate a block of a particular website, webpage or associated resources via a browser 50.

Figure 7:
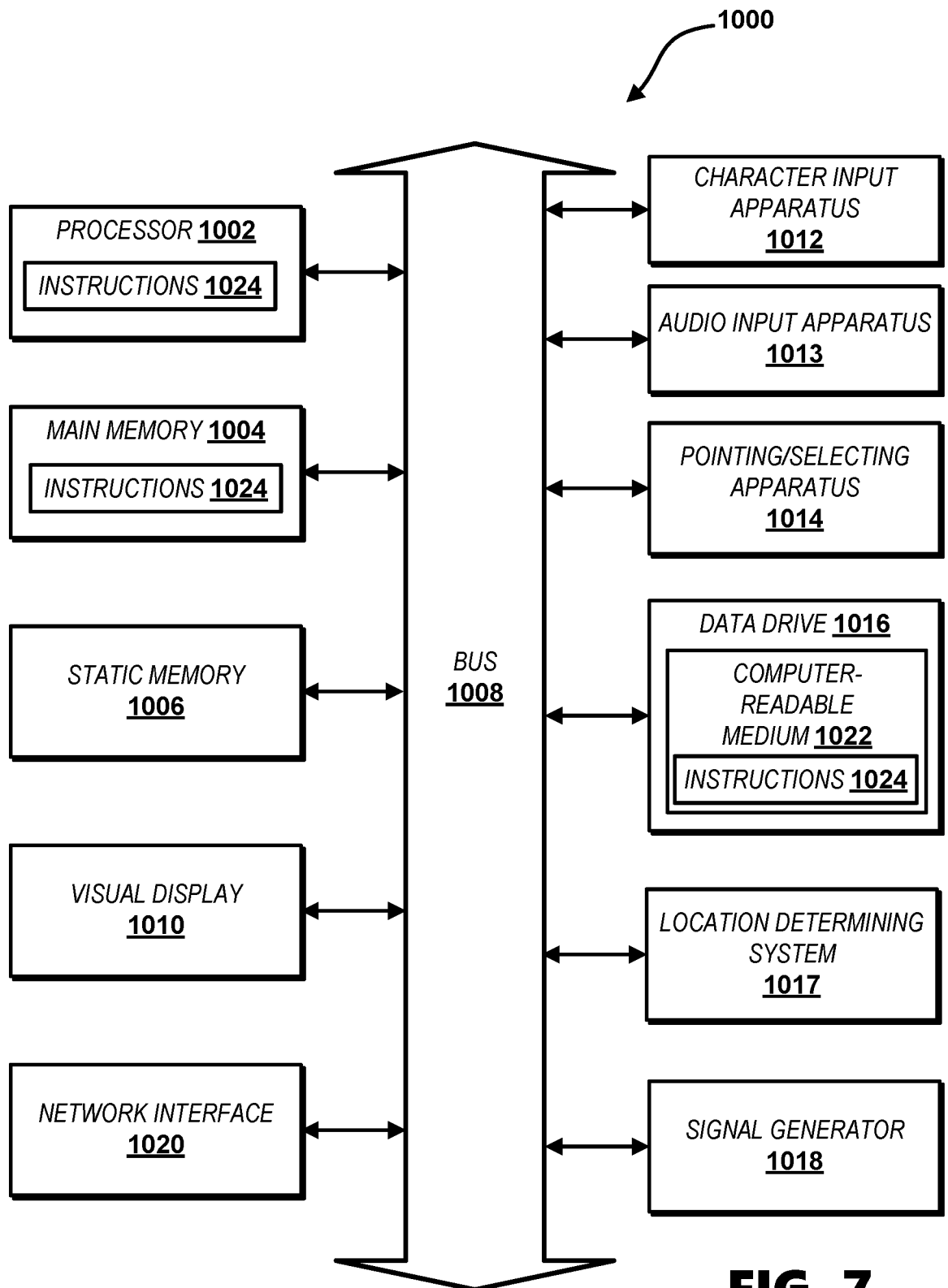
FIG. 7 is an illustrative computer system for performing described methods according to the illustrative embodiments.

FIG. 7 illustrates in abstract the function of an exemplary computer system 1000 on which the systems, methods and processes described herein can execute. For example, the computing device 12, developer system 16, privacy manager 20, application server 40, and application settings API 44 can each be embodied by a particular computer system 1000. The computer system 1000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 1024 executable by the computer system 1000.

The computer system 1000 can operate as a standalone device or can be connected (e.g., networked) to other machines. In a networked deployment, the computer system 1000 may operate in the capacity of a server or a client machine in server-client network environment, or as a peer machine in a peer-to-peer (or distributed) network environment. The computer system 1000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 1000 includes a processor 1002, for example a central processing unit (CPU) or a graphics processing unit (GPU), a main memory 1004, and a static memory 1006 in communication via a bus 1008. A visual display 1010 for example a liquid crystal display (LCD), light emitting diode (LED) display or a cathode ray tube (CRT) is provided for displaying data to a user of the computer system 1000. The visual display 1010 can be enabled to receive data input from a user for example via a resistive or capacitive touch screen. A character input apparatus 1012 can be provided for example in the form of a physical keyboard, or alternatively, a program module which enables a user-interactive simulated keyboard on the visual display 1010 and actuatable for example using a resistive or capacitive touchscreen. An audio input apparatus 1013, for example a microphone, enables audible language input which can be converted to textual input by the processor 1002 via the instructions 1024. A pointing/selecting apparatus 1014 can be provided, for example in the form of a computer mouse or enabled via a resistive or capacitive touch screen in the visual display 1010. A data drive 1016, a signal generator 1018 such as an audio speaker, and a network interface 1020 can also be provided. A location determining system 1017 is also provided which can include for example a GPS receiver and supporting hardware.

The instructions 1024 and data structures embodying or used by the herein-described systems, methods, and processes, for example software instructions, are stored on a computer-readable medium 1022 and are accessible via the data drive 1016. Further, the instructions 1024 can completely or partially reside for a particular time period in the main memory 1004 or within the processor 1002 when the instructions 1024 are executed. The main memory 1004 and the processor 1002 are also as such considered computer-readable media.

While the computer-readable medium 1022 is shown as a single medium, the computer-readable medium 1022 can be considered to include a single medium or multiple media, for example in a centralized or distributed database, or associated caches and servers, that store the instructions 1024. The computer-readable medium 1022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 1024 can be transmitted or received over a communications network, for example the communications network 8, using a signal transmission medium via the network interface 1020 operating under one or more known transfer protocols, for example FTP, HTTP, or HTTPs. Examples of communication networks include a local area network (LAN), a wide area network (WAN), the Internet, mobile telephone networks, Plain Old Telephone (POTS) networks, and wireless data networks, for example WiFi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor. While embodiments have been described in detail above, these embodiments are non-limiting and should be considered as merely exemplary. Modifications and extensions may be developed, and all such modifications are deemed to be within the scope defined by the appended claims.

What is claimed is:

1. A data control method comprising:
   receiving from a user an indication of data for sharing;
   receiving from the user an indication of at least one recipient with which to share the data;
   receiving from the user at least one allowed action for the data;
   determining a first multidimensional vector based on the indication of the data for sharing;
   determining a second multidimensional vector based on the indication of the at least one recipient with which to share the data;
   determining a third multidimensional vector based on the at least one allowed action for the data;
   determining a multidimensional zone based on the indication of the data for sharing, the indication of the at least one recipient, and the at least one allowed action for the data, the determining the multidimensional zone comprises determining a combined multidimensional vector based on the first multidimensional vector, the second multidimensional vector, and the third multidimensional vector;
   accessing via a network a plurality of application program interfaces (APIs) for a plurality of applications; and
   setting data sharing permissions for the user for each of the plurality of applications based on the multidimensional zone via the plurality of APIs.

2. The data control method of claim 1, the setting of the data sharing permissions comprising selecting predefined permissions via the plurality of APIs.

3. The data control method of claim 1, further comprising:
determining a modification by the user of the data sharing permissions for a particular one of the plurality of applications;
re-determining the multidimensional zone based on the modification of the data sharing permissions; and
re-setting the data sharing permissions for the user for at least one other of the plurality of applications based on the re-determined multidimensional zone via at least one of the plurality of APIs.

4. The data control method of claim 1, the receiving from the user of the indication of the data for sharing comprising receiving at least one of an indication of photos for sharing or an indication of contacts for sharing.

5. The data control method of claim 1, the receiving from the user of the indication of the data for sharing comprising receiving an indication of location of a computing device of the user.

6. The data control method of claim 1, the receiving from the user of the indication of the at least one recipient with which to share the data comprising receiving an indication of at least one of a particular application with which to share the data or an indication of a network destination with which to share the data.

7. The data control method of claim 1, the receiving from the user of the indication of the data for sharing comprising receiving an indication of data not for sharing, the data not for sharing comprising at least one of a name of the user, an address of the user, a telephone number of the user, an email address of the user, photos, or an identification number of the user.

8. The data control method of claim 1, the receiving from the user of the indication of the at least one recipient with which to share the data comprising receiving from the user an indication to share the data via the network.

9. The data control method of claim 1, wherein the setting of the data sharing permissions for the user for each of the plurality of applications comprises:
setting rules indicating information to be shared; and
setting rules indicating targets of the information to be shared;
wherein the setting of the rules indicating the information to be shared and the setting of the rules indicating the targets of the information to be shared comprises establishing a multidimensional coordinate based on the information to be shared and the targets of the information to be shared to be within the multidimensional zone.

10. The data control method of claim 1, wherein the setting of the data sharing permissions for the user for each of the plurality of applications comprises:
setting rules indicating information to be shared;
setting rules indicating targets of the information to be shared;
determining a first position vector based on the information to be shared; and
determining a second position vector based on the targets of the information to be shared;
wherein the setting of the rules indicating the information to be shared and the setting of the rules indicating the targets of the information to be shared comprises establishing a multidimensional coordinate based on the first position vector and the second position vector.

11. The data control method of claim 1, the receiving from the user the at least one allowed action for the data comprising receiving an indication that the data can be shared by the at least one recipient with other recipients.

12. The data control method of claim 1, the receiving from the user the at least one allowed action for the data comprising receiving an indication that the data can be used by the at least one recipient in building at least one of an application or a service.

13. The data control method of claim 1, the receiving from the user the at least one allowed action for the data comprising receiving an indication that the data can be used to enable transmission of at least one of advertisements, offers, or coupons to the user.

14. The data control method of claim 1, the receiving from the user the at least one allowed action for the data comprising receiving an indication that the data can be sold.

15. The data control method of claim 1, the receiving from the user the at least one allowed action for the data comprising receiving an indication that the data can be sold by the at least one recipient.

16. The data control method of claim 1, further comprising:
accessing for each of the plurality of applications at least one of a manifest, an end-user license agreement ("EULA"), or privacy settings; and
setting the data sharing permissions for the user further based on the at least one of the manifest, the EULA, or the privacy settings of each of the plurality of applications.

17. A data control method comprising:
receiving from a user an indication of data for sharing;
receiving from the user an indication of at least one recipient with which to share the data;
receiving from the user at least one allowed action for the data;
determining a first value on a first axis based on the indication of the data for sharing;
determining a second value on a second axis based on the indication of the at least one recipient with which to share the data;
determining a third value on a third axis based on the at least one allowed action for the data;
determining a multidimensional zone based on the indication of the data for sharing, the indication of the at least one recipient, and the at least one allowed action for the data, the determining the multidimensional zone comprising determining a combined multidimensional vector based on the first value on the first axis, the second value on the second axis, and the third value on the third axis;
accessing via a network a plurality of application program interfaces (APIs) for a plurality of applications; and
setting data sharing permissions for the user for each of the plurality of applications based on the multidimensional zone via the plurality of APIs.

18. A data control method comprising:
receiving from a particular user an indication of data for sharing;
receiving from the particular user an indication of at least one recipient with which to share the data;
receiving from the particular user at least one allowed action for the data;
receiving identifying information of the particular user;
receiving identifying information of a plurality of other users;
comparing the identifying information of the particular user and the identifying information of the plurality of other users;
receiving from the plurality of other users a plurality of indications of information for sharing;

receiving from the plurality of other users a plurality of indications of recipients with which to share the information for sharing;

receiving from the plurality of other users a plurality of allowed actions for the information for sharing; and determining a multidimensional zone based on the indication of the data for sharing, the indication of the at least one recipient, the at least one allowed action for the data, the plurality of indications of the information for sharing, the plurality of indications of the recipients with which to share the information for sharing, the plurality of allowed actions for the information for sharing, and the comparing of the identifying information of the particular user and the identifying information of the plurality of other users;

accessing via a network a plurality of application program interfaces (APIs) for a plurality of applications; and setting data sharing permissions for the particular user for each of the plurality of applications based on the multidimensional zone via the plurality of APIs.

19. A data control method comprising:

receiving from a user an indication of data for sharing;

receiving from the user an indication of at least one recipient with which to share the data;

receiving from the user at least one allowed action for the data;

determining a multidimensional zone based on the indication of the data for sharing, the indication of the at least one recipient, and the at least one allowed action for the data;

accessing via a network a plurality of application program interfaces (APIs) for a plurality of applications; and setting data sharing permissions for the user for each of the plurality of applications based on the multidimensional zone via the plurality of APIs, the setting of the data sharing permissions for the user for each of the plurality of applications comprising:

setting rules indicating information to be shared;

setting rules indicating targets of the information to be shared; and setting rules indicating allowed actions for the information;

wherein the setting of the rules indicating the information to be shared, the setting of the rules indicating the targets of the information to be shared, and the setting of the rules indicating the allowed actions for the information comprises establishing a multidimensional coordinate based on the information to be shared, the targets of the information to be shared, and the allowed actions for the information to be within the multidimensional zone.

20. A data control method comprising:

receiving from a user an indication of data for sharing;

receiving from the user an indication of at least one recipient with which to share the data;

receiving from the user at least one allowed action for the data;

determining a multidimensional zone based on the indication of the data for sharing, the indication of the at least one recipient, and the at least one allowed action for the data;

accessing via a network a plurality of application program interfaces (APIs) for a plurality of applications; and setting data sharing permissions for the user for each of the plurality of applications based on the multidimensional zone via the plurality of APIs, the setting of the data sharing permissions for the user for each of the plurality of applications comprising:

setting rules indicating information to be shared;

setting rules indicating targets of the information to be shared;

setting rules indicating allowed actions for the information;

determining a first position vector based on the information to be shared;

determining a second position vector based on the targets of the information to be shared; and determining a third position vector based on the allowed actions for the information;

wherein the setting of the rules indicating the information to be shared, the setting of the rules indicating the targets of the information to be shared, and the setting of the rules indicating the allowed actions for the information comprises establishing a multidimensional coordinate based on the first position vector, the second position vector, and the third position vector to be within the multidimensional zone.

21. A data control method comprising:

receiving from a user an indication of data for sharing;

receiving from the user an indication of at least one recipient with which to share the data;

receiving from the user at least one allowed action for the data;

determining a first multidimensional vector based on the indication of the data for sharing;

determining a second multidimensional vector based on the indication of the at least one recipient with which to share the data;

determining a third multidimensional vector based on the at least one allowed action for the data;

determining a multidimensional zone based on the indication of the data for sharing, the indication of the at least one recipient, and the at least one allowed action for the data, the determining the multidimensional zone comprises determining a combined multidimensional vector based on the first multidimensional vector, the second multidimensional vector, and the third multidimensional vector;

accessing via a network a plurality of application program interfaces (APIs) for a plurality of websites comprising a plurality of webpages; and setting data sharing permissions for the user for each of the plurality of websites based on the multidimensional zone via the plurality of APIs.

* * * * *